US012734826B2

(12) United States Patent
Nakano et al.

(10) Patent No.: US 12,734,826 B2
(45) **Date of Patent: *Sep. 15, 2026**

(54) LIQUID EJECTION SYSTEM TO FORM IMAGE WITH MANIFOLD GRADATIONS

(71) Applicant: BROTHER KOGYO KABUSHIKI KAISHA, Nagoya (JP)

(72) Inventors: Yasuhiro Nakano, Nagoya (JP); Satoru Arakane, Nagoya (JP); Masashi Ohhashi, Kasugai (JP); Koichi Tsugimura, Nagoya (JP); Naoyuki Nakamura, Nagoya (JP); Haruka Azechi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 85 days.

This patent is subject to a terminal disclaimer.

(21) Appl. No.: 18/678,116

(22) Filed: May 30, 2024

(65) Prior Publication Data

US 2024/0399760 A1 Dec. 5, 2024

(30) Foreign Application Priority Data

May 31, 2023 (JP) ................................ 2023-090026

(51) Int. Cl.
*B41J 2/21* (2006.01)
*B41J 2/175* (2006.01)

(52) U.S. Cl.
CPC ............. *B41J 2/2142* (2013.01); *B41J 2/175* (2013.01); *B41J 2/2103* (2013.01); *B41J 2/2139* (2013.01)

(58) Field of Classification Search
CPC ........ B41J 2/2142; B41J 2/175; B41J 2/2103; B41J 2/2139
See application file for complete search history.

(56) References Cited

U.S. PATENT DOCUMENTS 9,827,794 B2 * 11/2017 Miyamoto ............. B41J 19/145
2016/0279927 A1 9/2016 Miyamoto
2019/0217615 A1 * 7/2019 Yoshikawa ................ B41J 2/15

FOREIGN PATENT DOCUMENTS

JP 1-216852 A 8/1989

* cited by examiner

*Primary Examiner* — Lisa Solomon
(74) *Attorney, Agent, or Firm* — Merchant & Gould P.C.

(57) ABSTRACT

A liquid ejection system includes a head and a controller system. The head has nozzles including a first nozzle and a second nozzle. The nozzles are aligned in a first nozzle row and a second nozzle row that extend in a first direction and are arranged along a second direction intersecting the first direction. The controller system determines a first individual amount of liquid to be ejected from the first nozzle, and a second individual amount of liquid to be ejected from the second nozzle, based on a pixel value of a particular pixel in image data. The controller system controls the head to eject liquid from at least one of the first and second nozzles into a particular area on a recording medium according to the first and second individual amounts while moving one of the head and a recording medium relative to the other along the second direction.

14 Claims, 14 Drawing Sheets

| | TYPES OF INK AMOUNTS | | | | TOTAL INK AMOUNT(pl) |
|---|---|---|---|---|---|
| 1 | No | No | No | No | 0 |
| 2 | No | No | No | Small | 4 |
| 3 | No | No | No | Medium | 10 |
| 4 | No | No | No | Large | 35 |
| 5 | No | No | Small | Small | 8 |
| 6 | No | No | Small | Medium | 14 |
| 7 | No | No | Small | Large | 39 |
| 8 | No | No | Medium | Medium | 20 |
| 9 | No | No | Medium | Large | 45 |
| 10 | No | No | Large | Large | 70 |
| 11 | No | Small | Small | Small | 12 |
| 12 | No | Small | Small | Medium | 18 |
| 13 | No | Small | Small | Large | 43 |
| 14 | No | Small | Medium | Medium | 24 |
| 15 | No | Small | Medium | Large | 49 |
| 16 | No | Small | Large | Large | 74 |
| 17 | No | Medium | Medium | Medium | 30 |
| 18 | No | Medium | Medium | Large | 55 |
| 19 | No | Medium | Large | Large | 80 |
| 20 | No | Large | Large | Large | 105 |
| 21 | Small | Small | Small | Small | 16 |
| 22 | Small | Small | Small | Medium | 22 |
| 23 | Small | Small | Small | Large | 47 |
| 24 | Small | Small | Medium | Medium | 28 |
| 25 | Small | Small | Medium | Large | 53 |
| 26 | Small | Small | Large | Large | 78 |
| 27 | Small | Medium | Medium | Medium | 34 |
| 28 | Small | Medium | Medium | Large | 59 |
| 29 | Small | Medium | Large | Large | 84 |
| 30 | Small | Large | Large | Large | 109 |
| 31 | Medium | Medium | Medium | Medium | 40 |
| 32 | Medium | Medium | Medium | Large | 65 |
| 33 | Medium | Medium | Large | Large | 90 |
| 34 | Medium | Large | Large | Large | 115 |
| 35 | Large | Large | Large | Large | 140 |

FIG. 10

LIQUID EJECTION SYSTEM TO FORM IMAGE WITH MANIFOLD GRADATIONS

REFERENCE TO RELATED APPLICATIONS

This application claims priority from Japanese Patent Application No. 2023-090026 filed on May 31, 2023. The entire content of the priority application is incorporated herein by reference.

BACKGROUND ART

A known inkjet printer includes a recording head having three nozzle rows in a main scanning direction, each nozzle row having nozzles for different color ink arranged in a sub scanning direction. The recording head further has three nozzle rows arranged in the main scanning direction, each nozzle row having nozzles for ejecting black ink arranged in the sub scanning direction. The inkjet printer is enabled to perform printing at a three-times higher speed in a monochrome printing mode than in a color printing mode.

SUMMARY

In the known inkjet printer, it is not disclosed how large an amount of ink ejected from each of the plurality of nozzles is. In general, there is a limit to the variety of amounts of liquid ejectable from each individual nozzle. Therefore, the known inkjet printer is unable to form images with manifold gradations.

Aspects of the present disclosure relate to one or more improved techniques that make it possible for a liquid ejection system to form an image with manifold gradations.

According to aspects of the present disclosure, a liquid ejection system is provided, which includes a head and a controller system. The head has a plurality of nozzles including a first nozzle and a second nozzle. The plurality of nozzles are aligned in a first nozzle row and a second nozzle row. The first nozzle row and the second nozzle row extend in a first direction and are arranged along a second direction intersecting the first direction. The controller system is configured to determine a first individual amount of liquid to be ejected from the first nozzle, and a second individual amount of liquid to be ejected from the second nozzle, based on a pixel value of a particular pixel included in image data. The controller system is further configured to control the head to eject liquid of a same color from at least one of the first nozzle or the second nozzle into a particular area on a recording medium while moving one of the head and the recording medium relative to the other along the second direction. The first nozzle is controlled to eject the liquid of the determined first individual amount. The second nozzle is controlled to eject the liquid of the determined second individual amount. In the present disclosure, it is noted that an expression "at least one of A or B" may have substantially the same meaning as "at least one of A and/or B" or "at least one selected from a group consisting of A and B."

BRIEF DESCRIPTION OF DRAWINGS

FIG. 10 shows 35 types of total ink amounts determined by respective different combinations of four types of ink amounts.

DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

First Illustrative Embodiment

Figure 1:
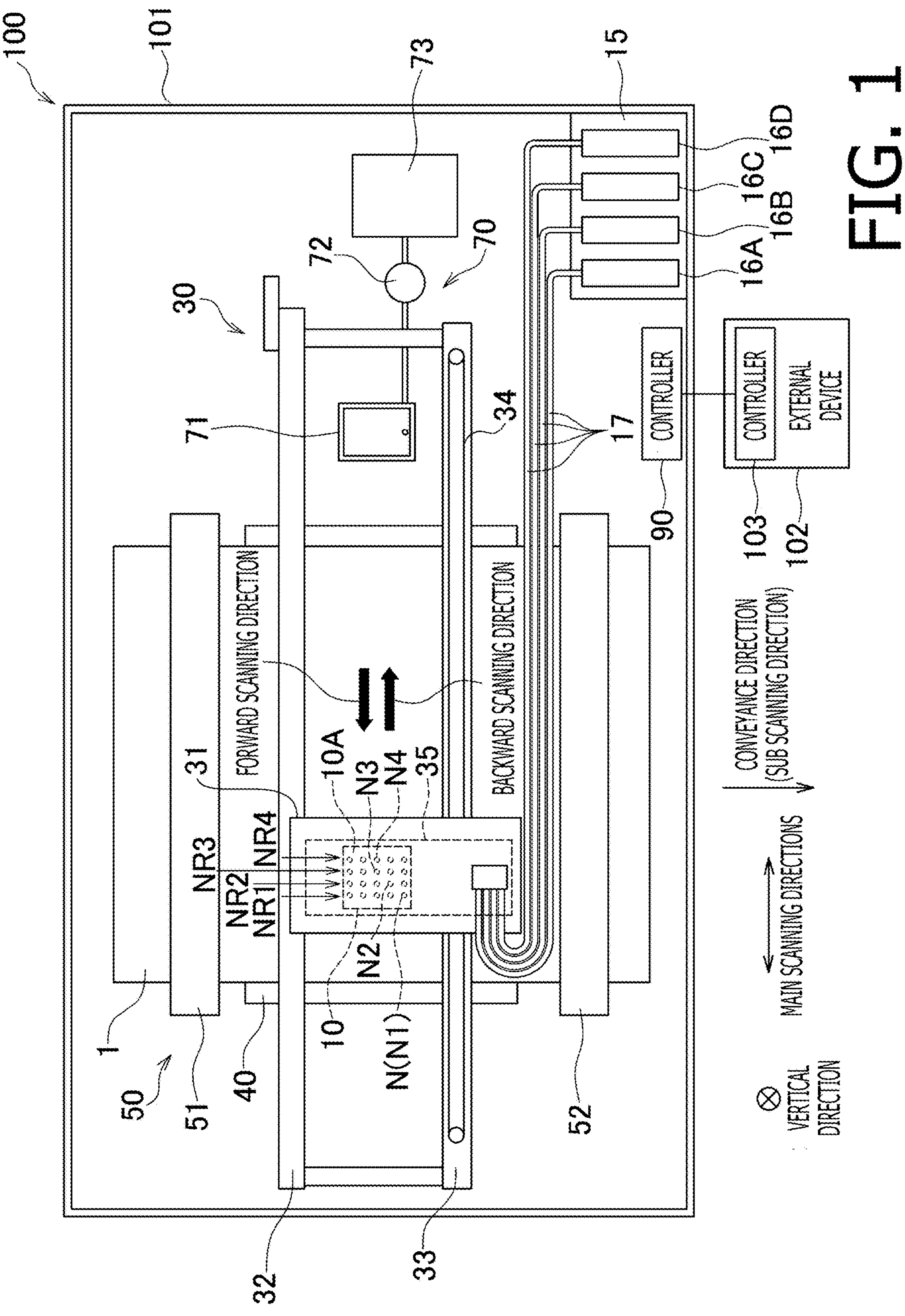
FIG. 1 is a plan view showing an overall configuration of a printing system.

As shown in FIG. 1, a printing system 100 includes a printer 101 and an external device 102. The external device 102 is connected with an after-mentioned controller 90 of the printer 101 and is configured to perform information communication with the controller 90 of the printer 101. The printing system 100 may be an example of a "liquid ejection system" according to aspects of the present disclosure. The printer 101 may be an example of a "liquid ejection apparatus" according to aspects of the present disclosure.

Referring to FIGS. 1 to 5, an overall configuration of the printer 101 and a configuration of each element included in the printer 101 will be described. As shown in FIG. 1, the printer 101 includes a head 10, a moving mechanism 30, a platen 40, a conveyor 50, a maintenance unit 70, and the controller 90. The head 10 has a plurality of nozzles N formed in a lower surface 10A thereof. The moving mechanism 30 is configured to move the head 10 along main scanning directions. The platen 40 is configured to support a sheet 1 from below. The conveyor 50 is configured to convey the sheet 1 in a conveyance direction. The main scanning directions are parallel to a left-right direction in FIG. 1, and are orthogonal to a vertical direction. The conveyance direction is a sub scanning direction that is orthogonal to the main scanning directions and the vertical direction. As will be described later, the main scanning directions include a forward scanning direction that is toward the left in FIG. 1, and a backward scanning direction that is opposite to the forward scanning direction and toward the right in FIG. 1.

The plurality of nozzles N form four nozzle rows NR1 to NR4 arranged along the main scanning directions. Each of the four nozzle rows NR1 to NR4 may be referred to as a "nozzle row NR" unless otherwise identified. Each of the nozzle rows NR1 to NR4 includes a plurality of nozzles N arranged at regular intervals along the sub scanning direction. A plurality of respective corresponding nozzles N, along the main scanning directions, of the four nozzle rows NR1 to NR4 are positioned to overlap when viewed in the main scanning directions. In the first illustrative embodiment, among the plurality of nozzles N included in each of the nozzle rows NR1 to NR4, any two nozzles N adjacent to each other in the sub scanning direction are arranged at intervals corresponding to a print resolution of 300 dpi of an image formed on the sheet 1 in an after-mentioned single scanning operation. The interval of the nozzles N in the sub scanning direction may be changed as necessary.

The four nozzle rows NR1 to NR4 are arranged at regular intervals along the main scanning directions. Each of the plurality of nozzles N included in the four nozzle rows NR1 to NR4 is configured to eject black ink. Namely, the printer 101 in the first illustrative embodiment is a monochrome printer.

Each nozzle row NR in the first illustrative embodiment has a plurality of nozzles N arranged linearly along the sub scanning direction. However, the plurality of nozzles N included in each nozzle row NR may not necessarily be arranged linearly along the sub scanning direction. Each nozzle row NR needs to have a plurality of nozzles N along the sub scanning direction. Namely, each nozzle row NR needs to have a plurality of nozzles from which points projected onto a straight line extending along the sub scanning direction are arranged at intervals corresponding to a particular print resolution, even though two nozzles adjacent to each other in the sub scanning direction among the plurality of nozzles are misaligned in the main scanning directions. Each nozzle row NR may have a plurality of nozzles N along a direction intersecting the sub scanning direction and the main-scanning directions.

Figure 5:
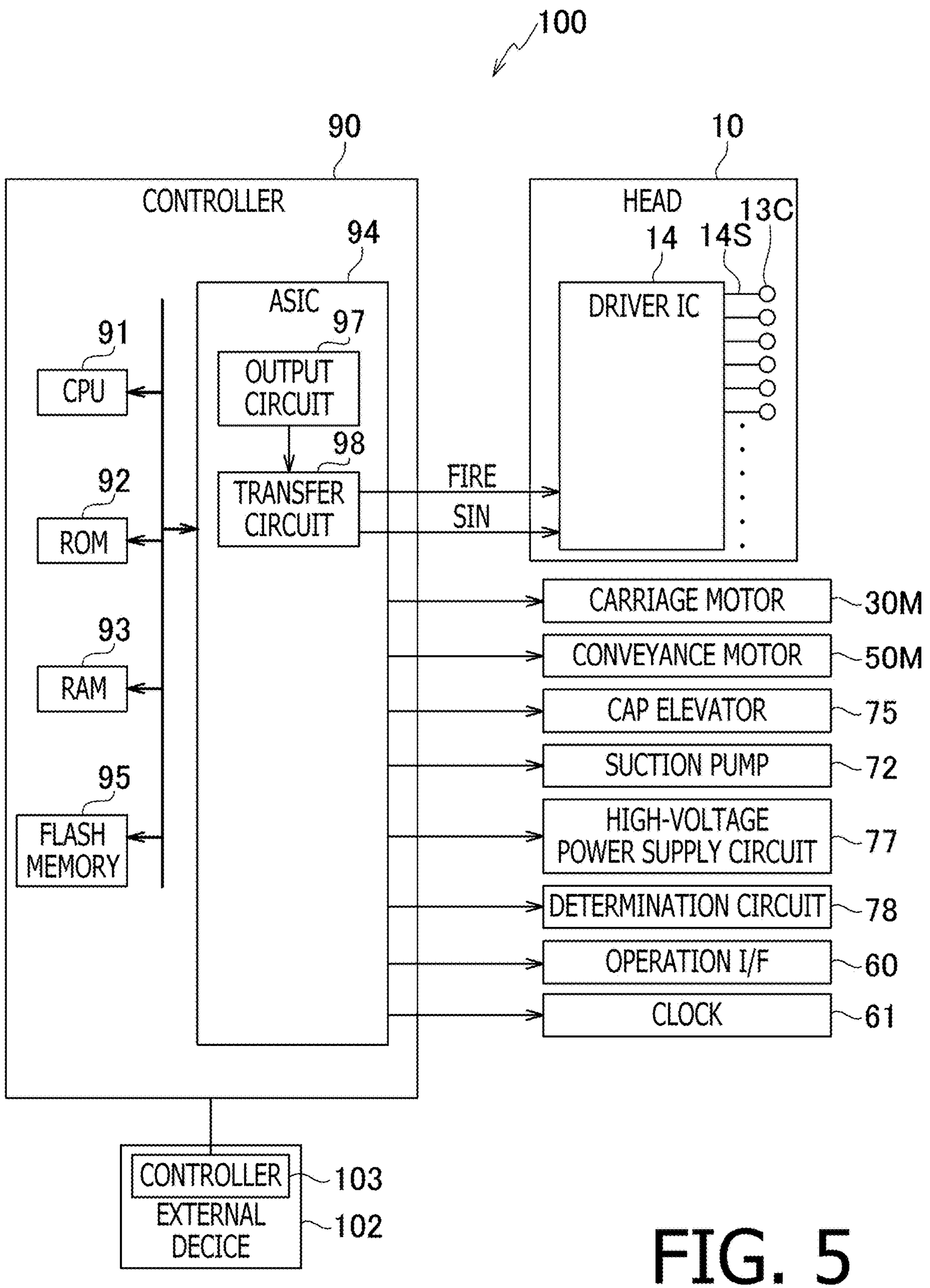
FIG. 5 is a block diagram showing an electrical configuration of the printing system.

The moving mechanism 30 includes a carriage 31, two guides 32 and 33, a belt 34, a sub tank 35, and a carriage motor 30M (see FIG. 5). The carriage 31 is configured to hold the head 10 and the sub tank 35. The two guides 32 and 33 are configured to support the carriage 31. The belt 34 is connected with the carriage 31. The two guides 32 and 33 and the belt 34 extend along the main scanning directions. When the carriage motor 30M is driven by the controller 90, the belt 34 travels, thereby moving the carriage 31 along the guides 32 and 33 along the main scanning directions.

The main scanning directions include a forward scanning direction that is toward the left in FIG. 1, and a backward scanning direction that is opposite to the forward scanning direction and toward the right in FIG. 1. The moving mechanism 30 is configured to move the head 10 in both the forward scanning direction and the backward scanning direction.

The printer 101 further includes a cartridge holder 15. The cartridge holder 15 has four ink cartridges 16A to 16D removably attached thereto. Each of the four ink cartridges 16A to 16D may be referred to as an "ink cartridge 16" unless otherwise identified.

The four ink cartridges 16A to 16D are arranged along the main scanning directions. Each of the four ink cartridges 16A to 16D is configured to store black ink. The black ink stored in each of the ink cartridges 16A to 16D may be the same in composition. The sub tank 35 has four individual tanks (not shown) corresponding to the nozzle rows NR1 to NR4, respectively. The four individual tanks are connected with the four ink cartridges 16A to 16D attached to the cartridge holder 15 through four tubes 17, respectively. Thereby, ink is supplied from the four ink cartridges 16A to 16D to the sub tank 35.

The head 10 is mounted on the carriage 31 and connected with a lower end portion of the sub tank 35. Ink supplied from each of the ink cartridges 16A to 16D to the sub tank 35 is supplied to a corresponding one of the nozzle rows NR1 to NR4. Namely, ink in the ink cartridge 16A is supplied to be ejected from a plurality of nozzles N1 included in the nozzle row NR1, and ink in the ink cartridge 16B is supplied to be ejected from a plurality of nozzles N2 included in the nozzle row NR2. Further, ink in the ink cartridge 16C is supplied to be ejected from a plurality of nozzles N3 included in the nozzle row NR3, and ink in the ink cartridge 16D is supplied to be ejected from a plurality of nozzles N4 included in the nozzle row NR4.

The platen 40 is disposed below the head 10. The sheet 1 is supported on an upper surface of the platen 40.

The conveyor 50 includes two roller pairs 51 and 52, and a conveyance motor 50M (see FIG. 5). The head 10 and the platen 40 are disposed between the roller pairs 51 and 52 in the conveyance direction. When the conveyance motor 50M is driven by the controller 90, rollers included in the roller pairs 51 and 52 rotate with the sheet 1 held thereby, and the sheet 1 is conveyed in the conveyance direction. Thus, the conveyor 50 conveys the sheet 1 relative to the head 10.

Figure 2:
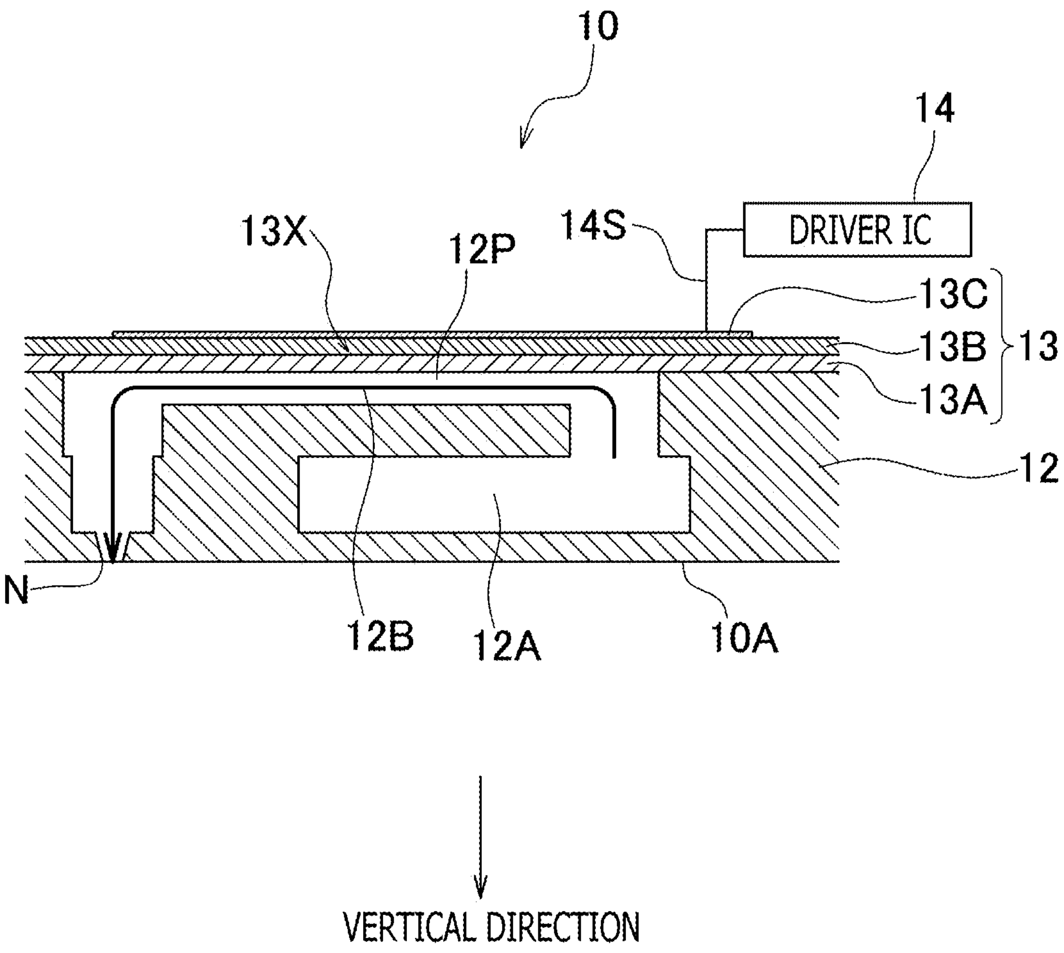
FIG. 2 is a cross-sectional view of a head.

As shown in FIG. 2, the head 10 includes a flow path unit 12 and an actuator unit 13.

The head 10 has a plurality of nozzles N (see FIG. 1) formed in a bottom surface 10A of the flow path unit 12. The flow channel unit 12 has thereinside four common flow paths 12A each of which is formed for a corresponding nozzle row NR, and a plurality of individual flow paths 12B each of which is formed to be individually communicated with a corresponding nozzle N. The four common flow paths 12A are communicated with the four ink cartridges 16A-16D via, e.g., the sub tank 35, respectively. Each individual flow path 12B is a flow path leading from an outlet of the common flow path 12A to the corresponding nozzle N through a pressure chamber 12P. A plurality of pressure chambers 12P are formed to open on an upper surface of the flow channel unit 12.

The actuator unit 13 includes a metal diaphragm 13A, a piezoelectric layer 13B, and a plurality of individual electrodes 13C. The metal diaphragm 13A is disposed to cover the plurality of pressure chambers 12P, on the upper surface of the flow channel unit 12. The piezoelectric layer 13B is disposed on an upper surface of the diaphragm 13A. The plurality of individual electrodes 13C are disposed to face the plurality of pressure chambers 12P, respectively, on an upper surface of the piezoelectric layer 13B.

The diaphragm 13A and the plurality of individual electrodes 13C are electrically connected with a driver IC 14. The driver IC 14 is configured to maintain an electric potential of the diaphragm 13A at the ground potential and to change an electric potential of each individual electrode 13C. Specifically, the driver IC 14 is configured to generate a drive signal based on control signals (e.g., a waveform signal FIRE and a selection signal SIN) from the controller 90 and to supply the generated drive signal to each individual electrode 13C via a corresponding signal line 14S. Thereby, the electric potential of each individual electrode 13C changes between a particular drive potential (VDD) and the ground potential (i.e., 0 V). As the electric potential of each individual electrode 13C changes, a particular portion (i.e., an actuator 13X), of the diaphragm 13A and the piezoelectric layer 13B, sandwiched between each individual electrode 13C and the corresponding pressure chamber 12P is deformed, thereby changing a volume of the pressure chamber 12P, applying pressure to the ink in the pressure chamber 12P, and ejecting ink from the corresponding nozzle N. The actuator 13X is provided for each individual electrode 13C, i.e., for each nozzle N. Each actuator 13X is configured to be independently deformed according to the electric potential applied to the corresponding individual electrode 13C.

As shown in FIG. 1, the maintenance unit 70 includes a cap 71, a suction pump 72, and a waste liquid tank 73. The cap 71 is disposed on the right side of the platen 40 in the left-right direction (parallel to the main scanning directions) in FIG. 1. When the carriage 31 is in a maintenance position on the right side of the platen 40 in the left-right direction in FIG. 1, the plurality of nozzles N are opposed to the cap 71.

The cap 71 is configured to be moved up and down by a cap elevator 75 (see FIG. 5). When the cap 71 is moved up by the cap elevator 75 in a state where the cap 71 is opposed to the plurality of nozzles N as the carriage 31 is located in the maintenance position, an upper end portion of the cap 71 is brought into close contact with the lower surface 10A of the head 10. Thereby, the plurality of nozzles N are covered by the cap 71. Practicable example configurations of the cap 71 are not limited to the configuration of the cap 71 to cover the plurality of nozzles N by coming into close contact with the lower surface 10A of the head 10. For instance, the cap 71 may cover the plurality of nozzles N by coming into close contact with a frame (not shown) disposed around the lower surface 10A of the head 10.

For instance, the suction pump 72 is a tube pump. The suction pump 72 is connected with the cap 71 and the waste liquid tank 73. In the maintenance unit 70, when the suction pump 72 is driven in the state where the plurality of nozzles N are covered by the cap 71 as described above, it is possible to perform so-called suction purge (i.e., a recovery operation) to eject ink in the head 10 from the plurality of nozzles N. The ink ejected by the suction purge is stored in the waste liquid tank 73.

For the sake of explanatory convenience, the above explanation has been given under an assumption that the cap 71 collectively covers all the nozzles N and causes ink in the head 10 to be ejected from all the nozzles N in the suction purge. However, practicable examples are not limited to this. For instance, the cap 71 may have separate portions including a portion to cover the plurality of nozzles N1 included in the leftmost nozzle row NR1 and another portion to cover the plurality of nozzles N2 to N4 included in the remaining three nozzle rows NR2 to NR4. In this case, in the suction purge, the ink in the head 10 may be ejected selectively from the plurality of nozzles N1 included in the nozzle row NR1 or the plurality of nozzles N2 to N4 included in the nozzle rows NR2 to NR4. In another instance, the cap 71 may be provided separately for each nozzle row NR. In this case, in the suction purge, the ink in the head 10 may be ejected from the plurality of nozzles N separately for each nozzle row NR.

Figure 3:
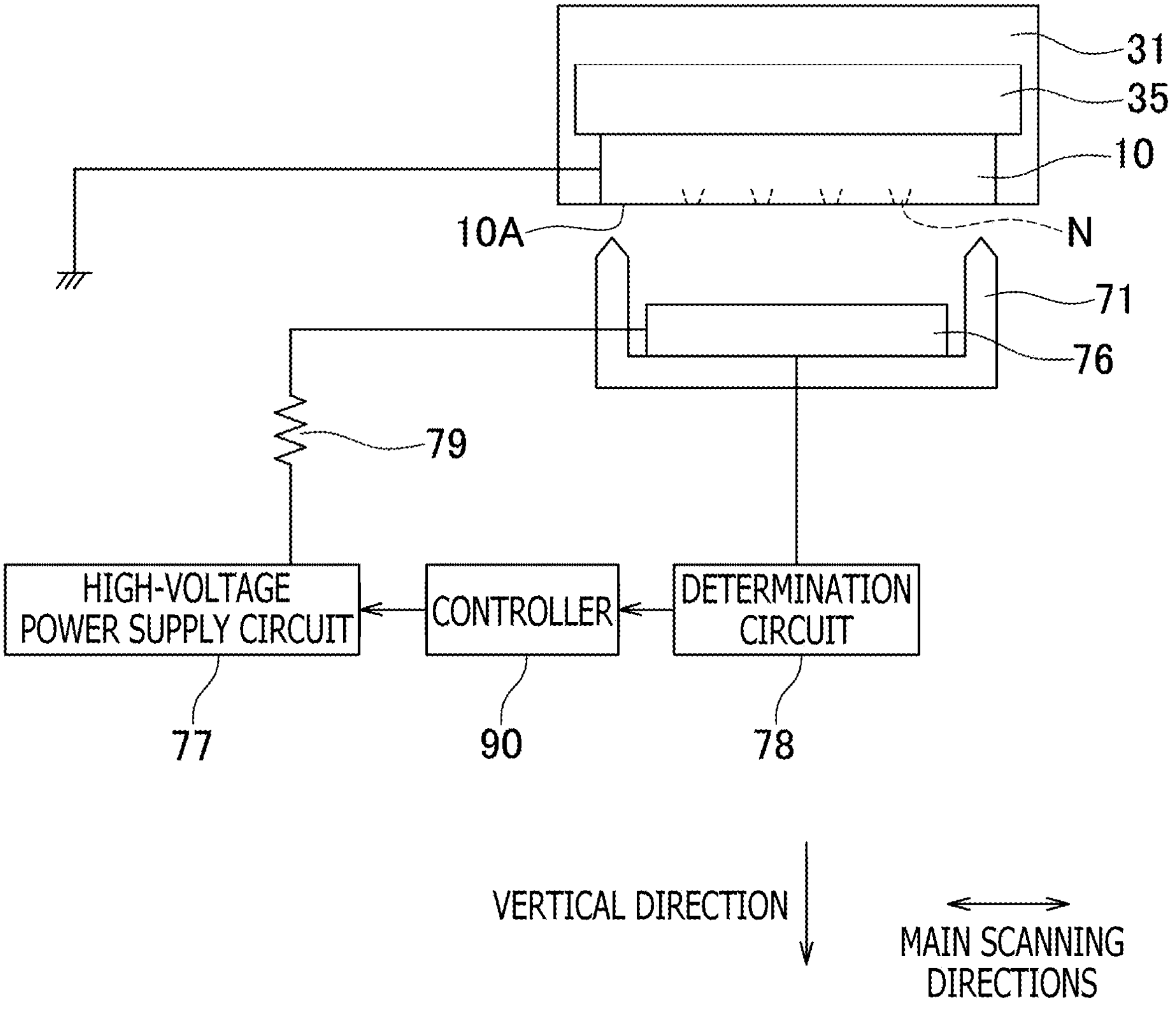
FIG. 3 shows a connection relationship among a detection electrode disposed in a cap, a high-voltage power supply circuit, and a determination circuit.

As shown in FIG. 3, a detection electrode 76 formed in a rectangular planar shape is disposed in the cap 71. The detection electrode 76 is connected with a high-voltage power supply circuit 77 via a resistor 79. During after-mentioned inspection driving, a particular positive electric potential (e.g., about 600 V) is applied to the detection electrode 76 by the high-voltage power supply circuit 77. Meanwhile, the electric potential of the head 10 is maintained at the ground potential. Thereby, a particular potential difference is generated between the head 10 and the detection electrode 76. A determination circuit 78 is connected with the detection electrode 76. The determination circuit 78 is configured to compare an electric potential of a signal output from the determination electrode 76 with a threshold value VT and output a signal according to a result of the comparison.

Figure 4A:
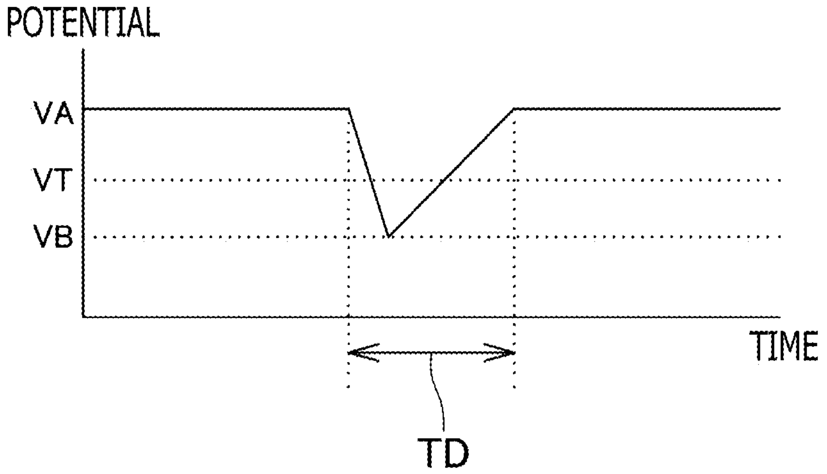
FIG. 4A shows a change in electric potential of the detection electrode when ink is ejected from a nozzle.

More specifically, the ink ejected from the nozzles N is charged due to the potential difference between the head 10 and the detection electrode 76. When ink is ejected from a nozzle N toward the detection electrode 76 in the state where the carriage 31 is in the maintenance position, as shown in FIG. 4A, the charged ink approaches the detection electrode 76, and until the ink lands on the detection electrode 76, the electric potential of the detection electrode 76 decreases from a potential VA, which is an electric potential when the head 10 is not driven, and reaches a potential VB, which is lower than the potential VA. Then, after the charged ink lands on the detection electrode 76, the electric potential of the detection electrode 76 gradually increases and returns to the potential VA. Namely, the potential of the detection electrode 76 changes during a driving period TD in which the head 10 is driven.

Figure 4B:
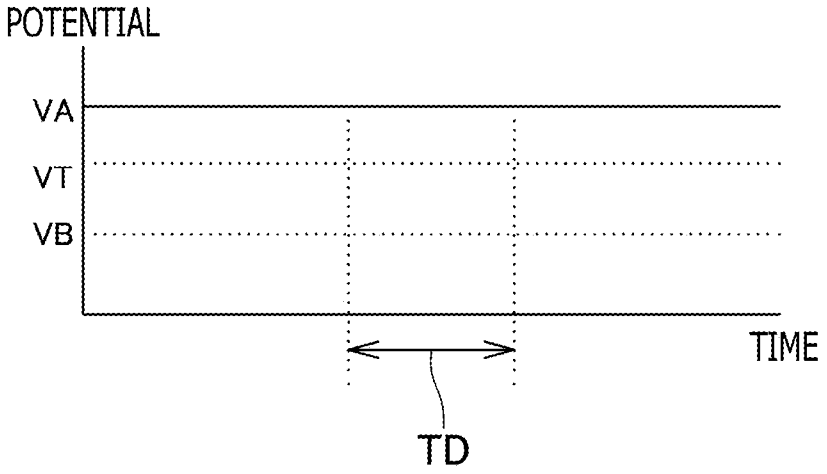
FIG. 4B shows a change in electric potential of the detection electrode when ink is not ejected from the nozzle.

On the other hand, when ink is not ejected from any nozzles N, as shown in FIG. 4B, the electric potential of the detection electrode 76 hardly changes from the potential VA during the driving period TD for the head 10. Therefore, the determination circuit 78 has the threshold value VT ($VB<VT<VA$) set to distinguish between the states shown in FIGS. 4A and 4B. The determination circuit 78 compares an electric potential of the voltage signal output from the detection electrode 76 with the threshold value VT during the drive period TD for the head 10, and outputs a determination signal according to a result of the comparison. In the first illustrative embodiment, a combination of the detection electrode 76, the high-voltage power supply circuit 77, the resistor 79, and the determination circuit 78 may be an example of a "detector" according to aspects of the present disclosure. The "detector" may be configured to output a determination signal according to whether each nozzle N is an abnormal nozzle that is unable to eject ink normally.

In the first illustrative embodiment, a positive potential is applied to the detection electrode 76 by the high-voltage power supply circuit 77. However, a negative potential (e.g., about −600 V) may be applied to the detection electrode 76 by the high-voltage power supply circuit 77. In this case, contrary to the above, when ink is ejected from a nozzle N toward the detection electrode 76 in the state where the carriage 31 is in the maintenance position, the charged ink approaches the detection electrode 76, and until the ink lands on the detection electrode 76, the electric potential of the detection electrode 76 increases from the potential VA. Then, after the charged ink lands on the detection electrode 76, the electric potential of the detection electrode 76 gradually decreases and returns to the potential VA.

As shown in FIG. 5, the controller 90 includes a CPU 91, a ROM 92, a RAM 93, an ASIC 94, and a flash memory 95. The controller 90 may be included in a "controller system" according to aspects of the present disclosure.

The ROM 92 stores programs and data for the CPU 91 and the ASIC 94 to perform various controls. The RAM 93 is configured to temporarily store data (e.g., print data) used by the CPU 91 and the ASIC 94 to execute the programs. The controller 90 is communicably connected with the external device 102. The controller 90 is configured to perform an after-mentioned printing process by the CPU 91 and the ASIC 94, based on print commands output from the external device 102.

In the printing process, according to commands from the CPU 91, the ASIC 94 drives the driver IC 14, the carriage motor 30M, and the conveyance motor 50M based on a print command (including after-mentioned print data) received from the external device 102, thereby performing a conveyance operation to cause the conveyor 50 to convey the sheet 1 over a particular distance in the conveyance direction, and a scanning operation to cause the head 10 to eject ink from the nozzles N when the head 10 is facing the sheet 1 while causing the moving mechanism 30 to move the head 10 along the main scanning directions. Thus, ink dots are formed on the sheet 1, and an image is recorded.

As shown in FIG. 5, the ASIC 94 includes an output circuit 97 and a transfer circuit 98. The output circuit 97 is configured to generate a waveform signal FIRE and a selection signal SIN and output these generated signals to the transfer circuit 98 at each print cycle. The print cycle is a period of time required for the sheet 1 to move relative to the head 10 by a unit distance corresponding to a print resolution for the image formed on the sheet 1. Namely, the print cycle corresponds to one pixel.

The waveform signal FIRE is a serial signal having four pieces of waveform data in series. The four pieces of waveform data correspond to "No (No Ejection)," "Small," "Medium," and "Large" amounts of ink ejected from a nozzle N during an ejection period within one print cycle, respectively. The four pieces of waveform data have respective numbers of pulses that are different from each other. In the first illustrative embodiment, the amount of ink for "Small" is 4 pl. The amount of ink for "Medium" is 10 pl. The amount of ink for "Large" is 35 pl. The amount of ink for "No" is 0 pl since "No" represents no ink ejected. Thus, in the first illustrative embodiment, four different amounts of ink may be ejected from each nozzle N in each ejection period. The ejection period is a period of time during which ink is ejected once from a nozzle N within one print cycle. These different amounts of ink may be changed as needed.

The selection signal SIN is a serial signal including selection data for selecting one of the above four pieces of waveform data. The selection signal SIN is generated for each actuator 13X at each print cycle, based on the print data included in the print command.

The transfer circuit 98 is configured to transfer the waveform signal FIRE and the selection signal SIN received from the output circuit 97 to the driver IC 14. The transfer circuit 98 has an LVDS ("LVDS" is an abbreviation for "Low Voltage Differential Signaling) driver incorporated therein that corresponds to each of the above signals, thereby transferring each signal to the driver IC14 as a pulsed differential signal.

In the printing process, the ASIC 94 controls the driver IC 14 to generate a drive signal based on the waveform signal FIRE and the selection signal SIN for each pixel and to supply the generated drive signal to the corresponding individual electrode(s) 13C via the corresponding signal line(s) 14S. Thereby, the ASIC 94 causes the head 10 to eject onto the sheet 1 a particular amount of ink, selected from among the four different ejection amounts ("No," "Small," "Medium," and "Large"), from each of one or more nozzles N for each pixel.

The ASIC 94 is electrically connected with the driver IC 14, the carriage motor 30M, the conveyance motor 50M, the cap elevator 75, the suction pump 72, and the high-voltage power supply circuit 77. In addition, the ASIC 94 is configured to receive a determination signal output from the determination circuit 78.

As shown in FIG. 5, in addition to the elements described above, the printer 101 further includes an operation I/F 60 and a clock 61. For instance, the operation I/F 60 includes operable members such as buttons disposed on a housing of the printer 101. By operating the operation I/F 60, the user is allowed to input signals into the controller 90.

In the first illustrative embodiment, the operation I/F 60 includes a power switch (not shown). By operating the power switch, the user is allowed to switch between a power-on state and a power-off state of the printer 101. When the user turns on the printer 101 by operating the power switch of the operation I/F 60, the operation I/F 60 outputs a power-on signal indicating that the printer 101 is turned on, and the controller 90 receives the power-on signal from the operation I/F.

The clock 61 is configured to keep track of time. The controller 90 is configured to receive a time signal indicating the time from the clock 61.

For instance, the external device 102 is a PC ("PC" is an abbreviation for "Personal Computer") and includes a controller 103 configured to take overall control of the external device 102. The controller 103 is connected with the controller 90 of the printer 101. The controller 103 may be included in the "controller system" according to aspects of the present disclosure. In substantially the same manner as the controller 90, the controller 103 includes a CPU (not shown), a ROM (not shown), a RAM (not shown), an ASIC (not shown), and a flash memory (not shown).

Control During Ejection Inspection for Nozzles

Next, the control by the controller 90 when an ejection inspection for the nozzles N is performed in the printer 101 will be described. When the printer 101 is in a standby mode, the controller 90 performs a process shown in FIG. 6.

Figure 6:
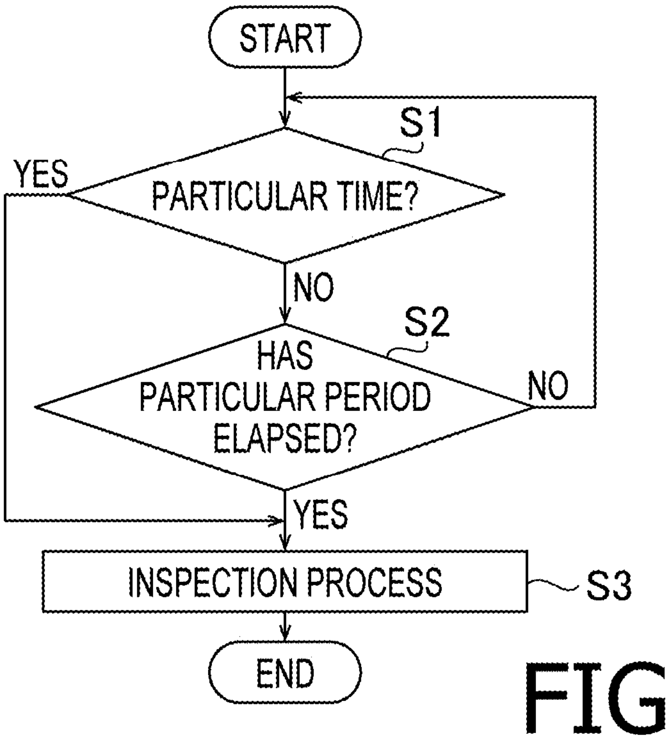
FIG. 6 is a flowchart showing a process to be performed by a printer when an ejection inspection for nozzles is performed in the printer.

To describe the process shown in FIG. 6 in more detail, the controller 90 determines whether the time signal received from the clock 61 indicates a particular time (S1). In response to determining that the time signal received from the clock 61 does not indicate the particular time (S1: No)

and that a particular period has not elapsed since a previous inspection process (S2: No), the controller 90 goes back to S1. In other words, the controller 90 waits while it is determined that the time signal received from the clock 61 does not indicate the particular time (S1: No) and that the particular period has not elapsed since the previous inspection process (S2: No). The inspection process will be described later.

The particular period is a period of time for periodically performing the inspection process. In S2, the controller 90 determines whether the particular period has elapsed since the previous inspection process based on the time signal from the clock 61 and after-mentioned inspection history information.

In response to determining that the time signal received from the clock 61 indicates the particular time (S1: Yes), the controller 90 proceeds to S3. In the first illustrative embodiment, the particular time is set to a time (e.g., 6:00 AM) early morning. However, practicable examples of the particular time are not limited to this.

In response to determining that the time signal received from the clock 61 does not indicate the particular time (S1: No) and that the particular period has elapsed since the previous inspection process (S2: Yes), the controller 90 also proceeds to S3. As the particular period has elapsed since the previous inspection process, the viscosity of the ink in the individual nozzles N may change, and a status indicating whether the individual nozzles N are normal or abnormal may change. Therefore, in the first illustrative embodiment, when the particular period has elapsed since the previous inspection process, the controller 90 causes the head 10 to perform inspection driving. Thereby, it is possible to accurately identify abnormal nozzle(s).

In S3, the controller 90 performs the inspection process. In the inspection process, the controller 90 sends to the driver IC 14 control signals for causing the head 10 to perform the inspection driving to sequentially eject ink from each of the plurality of nozzles N. In the inspection driving in the first illustrative embodiment, the amount of ink ejected from each nozzle N is "Small" but may be "Medium" or "Large." At this time, the controller 90 stores inspection history information in the flash memory 95 based on the time signal from the clock 61. The inspection history information includes information of the time when the inspection driving was performed. Then, the controller 90 stores in the flash memory 95 all the information of nozzles N that are determined as abnormal nozzles among the plurality of nozzles N, based on the determination signal output for each nozzle N from the determination circuit 78 during the inspection driving. Thus, the process during the ejection inspection for the nozzles N is completed.

In the first illustrative embodiment, the inspection driving is performed in response to the time signal received from the clock 61 indicating the particular time (S1: Yes) or the particular period having elapsed since the previous inspection process (S2: Yes). However, the inspection driving for the inspection process may be performed in response to other triggers (e.g., in response to receipt of a power-on signal from the operation I/F 60).

Control During Printing

Figure 7:
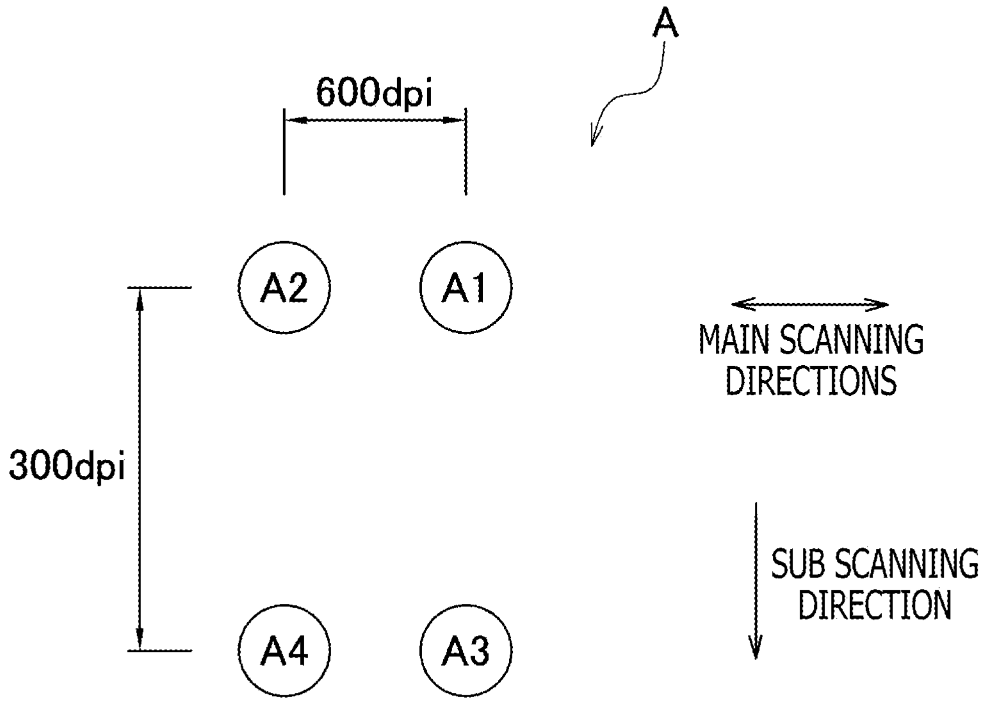
FIG. 7 illustrates image data of an image including four pixels.

Subsequently, the control by the printing system 100 to cause the printer 101 to perform printing on a sheet 1 will be described. In the first illustrative embodiment, as shown in FIG. 7, an explanation will be given of the control by the printing system 100 to print an image A on the sheet 1 at a resolution of 600 dpi in the main scanning directions and 300 dpi in the sub scanning direction. The resolutions may be changed as necessary. In the first illustrative embodiment, the image A is a grayscale image. The shading of gray for each of pixels A1 to A4 included in the image A is expressed in 256 gradations using an 8-bit value. The shading of gray for each pixel may not necessarily be expressed in 256 gradations, but may be expressed in less or more than 256 gradations.

Figure 8:
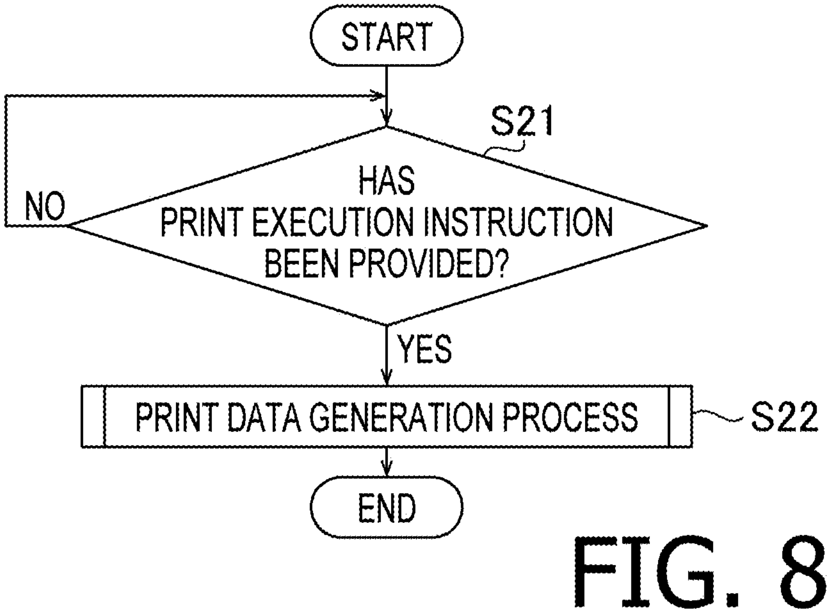
FIG. 8 is a flowchart showing an example procedure of a process to be performed by an external device when printing is performed by the printing system.

In the external device 102, when the user inputs a print execution instruction to perform printing on the sheet 1 using an input I/F (not shown), the controller 103 performs a process shown in FIG. 8. The print execution instruction is provided, for instance, in response to the user selecting a print execution button for performing printing on a display (not shown) via the input I/F.

To describe the process shown in FIG. 8 in more detail, the controller 103 first determines whether a print execution instruction has been provided (S21). In response to determining that a print execution instruction has not been provided (S21: No), the controller 103 goes back to S21 and repeatedly executes S21. In response to determining that a print execution instruction has been provided (S21: Yes), the controller 103 performs a print data generation process (S22).

Figure 9:
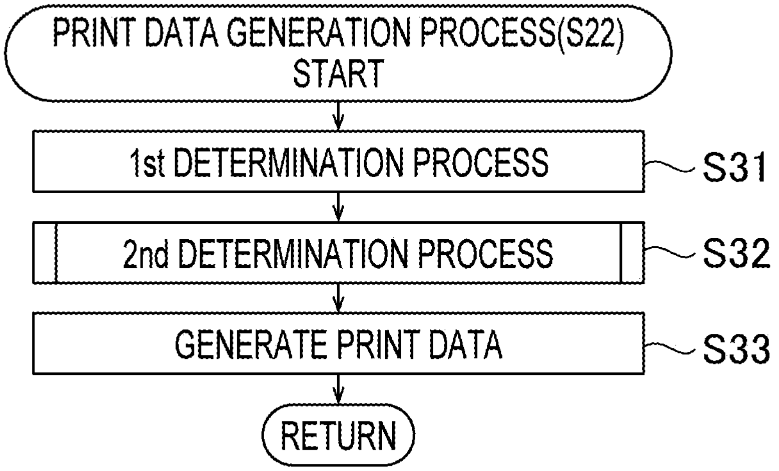
FIG. 9 is a flowchart showing an example procedure of a print data generation process to be performed in the process shown in FIG. 8.

The print data generation process in S22 is performed according to a procedure shown in FIG. 9. Print data is data indicating an individual ink amount of ink to be ejected from each nozzle N during the ejection period within the print cycle, for each pixel included in the image data of the image A to be printed this time. The print data is generated based on the image data of the image A. If the image for which the print execution instruction has been provided is a color image, the controller 103 may perform a process to convert the color image into a grayscale image, thereby obtaining the image data of the image A. As shown in FIG. 9, the controller 103 first performs a first determination process (S31).

The controller 103 stores 35 types of total ink amounts and 34 types of threshold values. As shown in FIG. 10, the 35 types of total ink amounts are 35 different total ink amounts determined by respective different combinations of the four types of ink amounts corresponding to "No," "Small," "Medium," and "Large." In the first illustrative embodiment, one pixel may be expressed in 35 gradations.

The 34 types of threshold values include first to 34th threshold values for distinguishing, as appropriate, which of the 35 types of total ink amounts a density expressed by a pixel value corresponds to. Specifically, for instance, the first threshold value is a threshold value corresponding to a density between the density expressed with a total ink amount of 0 pl and the density expressed with a total ink amount of 4 pl. The second threshold value is a threshold value corresponding to a density between the density expressed with a total ink amount of 4 pl and the density expressed with a total ink amount of 8 pl. Thus, the first to 34th threshold values are set in order according to the total ink amount. When the pixel value of a pixel is less than the first threshold value, the total ink amount for the pixel corresponds to 0 pl. When the pixel value of a pixel is equal to or more than the first threshold value and less than the second threshold value, the total ink amount for the pixel corresponds to 4 pl. Thus, when the pixel value of a pixel is equal to or more than the K-th (K is a natural number) threshold value and less than the (K+1)-th threshold value, the total ink amount for the pixel corresponds to the total ink amount between these threshold values. When the pixel value for a pixel is more than the 34th threshold value, the total ink amount for the pixel corresponds to a total ink amount of 140 pl. In the first illustrative embodiment, each of the 34 types of threshold values is represented by an 8-bit value. It is preferable that each threshold value is determined based on the total ink amount suitable for expressing the shading of gray for an individual pixel in a 256-gradation grayscale image.

In the first determination process (S31), the controller 103 determines the total ink amount for each of the pixels A1 to A4 from the pixel value of each of the pixels A1 to A4 in the image data of the image A. Specifically, the controller 103 determines which, of the 35 types of total ink amounts distinguished by the 34 types of threshold values, the pixel value of each of the pixels A1 to A4 corresponds to, and derives the total ink amount for each of the pixels A1 to A4. In the first illustrative embodiment, for instance, the total ink amount for the pixel A1 corresponds to 49 pl. The following explanation will be given mainly about the pixel A1. Nonetheless, substantially the same applies to the other pixels A2 to A4.

Figure 11A:
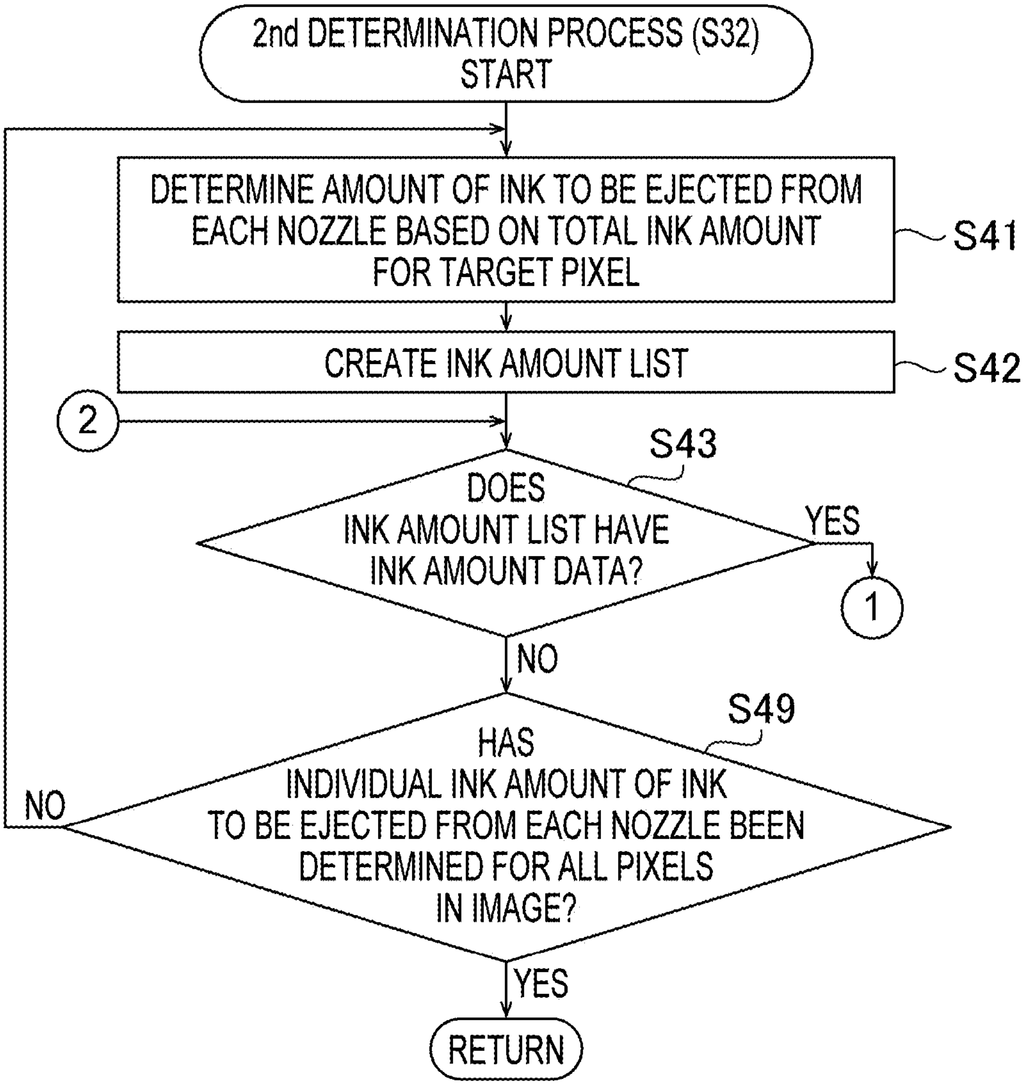
FIGS. 11A and 11B are flowchart showing an example procedure of a second determination process to be performed in the print data generation process shown in FIG. 9.
Figure 11B:
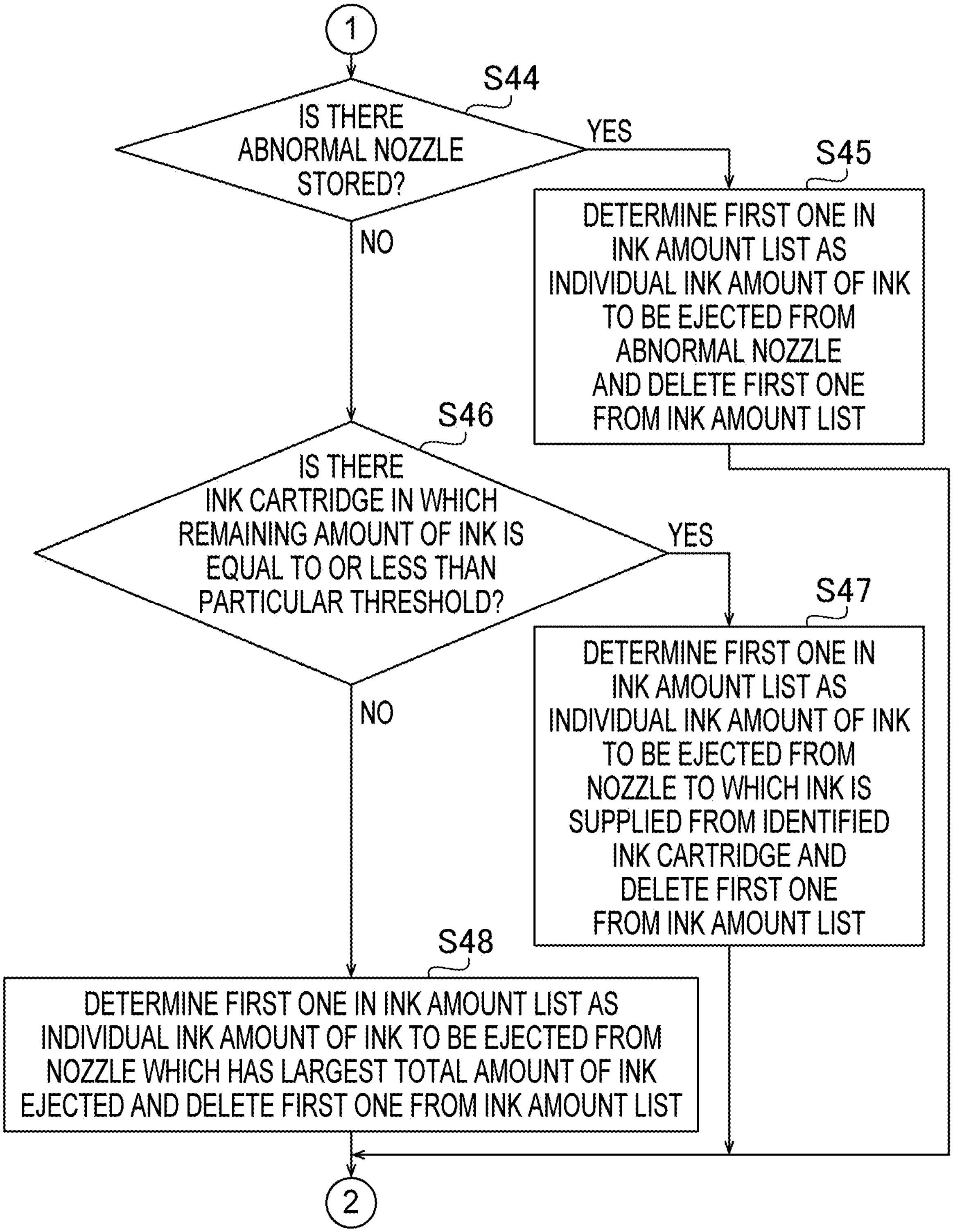

Next, the controller 103 performs a second determination process (S32). The second determination process in S32 is performed according to a procedure shown in FIGS. 11A and 11B. As shown in FIG. 11A, the controller 103 first determines an amount of ink to be ejected from each of the four nozzles N based on the total ink amount for a target pixel (S41). In the first illustrative embodiment, ink is discharged from at most four nozzles N1 to N4 to form a dot corresponding to the target pixel. Namely, the four nozzles N1 to N4 are assigned to the target pixel. The four nozzles N1 to N4 belong to the four nozzle rows NR1 to NR4, respectively. The four nozzles N1 to N4 are arranged in a straight line along the main scanning directions. For instance, in S41, the controller 103 determines "No," "Small," "Medium," or "Large" as an amount of ink to be ejected from each of the four nozzles N1 to N4 for the total ink amount of the pixel A1 (see FIG. 10). It is noted that a "first liquid amount" according to aspects of the present disclosure may correspond to either ink amount of "No," "Small," or "Medium." A "second liquid amount" according to aspects of the present disclosure may correspond to either ink amount of "Small," "Medium," or "Large" that is larger than the "first liquid amount." For instance, when the "first liquid amount" corresponds to an ink amount of "Small," the "second liquid amount" corresponds to either ink amount of "Medium" or "Large."

Next, the controller 103 creates and stores an ink amount list in which ink amounts are arranged in an ascending order (S42). For instance, for the pixel A1, the ink amount list is created in which ink amounts are arranged in the order of "No," "Small," "Medium," and "Large."

Next, the controller 103 determines whether the ink amount list has ink amount data (i.e., the ink amount list is not empty) (S43). In response to determining that the ink amount list has ink amount data (i.e., the ink amount list is not empty) (S43: Yes), the controller 103 determines whether there is an abnormal nozzle stored in the flash memory 95 among the four nozzles N1 to N4 corresponding to the target pixel (S44).

In response to determining that there is an abnormal nozzle stored in the flash memory 95 among the four nozzles N1 to N4 corresponding to the target pixel (S44: Yes), the controller 103 determines the first one (i.e., the smallest ink amount) in the ink amount list as an individual ink amount of ink to be ejected from the abnormal nozzle, and deletes the first one (i.e., the smallest ink amount) from the ink amount list (S45). After S45, the controller 103 goes back to S43. The determined individual ink amount for each nozzle N is stored in the flash memory of the controller 103.

On the other hand, in response to determining that there are no abnormal nozzles stored in the flash memory 95 among the four nozzles N1 to N4 corresponding to the target pixel (S44: No), the controller 103 determines whether there is an ink cartridge 16 in which a remaining amount of ink is equal to or less than a particular threshold among ink cartridge(s) 16 that supply ink to nozzle(s) N for which the individual ink amount has not yet been determined (S46). In the first illustrative embodiment, the controller 90 of the printer 101 stores a total amount of ink ejected from each nozzle N. For instance, each time a printing process for a single sheet 1 is completed, the remaining amount of ink in each of the ink cartridges 16A to 16D is derived and stored. The total amount of ink ejected from each nozzle N and the remaining amount of ink in each of the ink cartridges 16A to 16D are stored in the flash memory 95. The controller 103 makes the determination in S46 based on the remaining amount of ink in each of the ink cartridges 16A to 16D that is stored in the flash memory 95. The remaining amount of ink in each of the ink cartridges 16A to 16D may be derived each time ink is discharged from a corresponding nozzle N. In another instance, the remaining amount of ink in each of the ink cartridges 16A to 16D may be derived at an appropriate timing other than the aforementioned timing. A remaining amount sensor may be provided to detect the remaining amount of ink in each of the ink cartridges 16A to 16D. In this case, the determination in S46 may be made based on whether the remaining amount of ink in each of the ink cartridges 16A to 16D as detected by the corresponding remaining amount sensor is equal to or less than the particular threshold.

In response to determining that there is an ink cartridge 16 in which the remaining amount of ink is equal to or less than the particular threshold (S46: Yes), the controller 103 determines the first one (i.e., the smallest ink amount) in the ink amount list as the individual ink amount of ink to be ejected from the nozzle N to which ink is supplied from the ink cartridge 16 identified, and deletes the first one from the ink amount list (S47). In S47, when there exist a plurality of ink cartridges 16 in which the remaining amount of ink is equal to or less than the particular threshold, and there exist a plurality of nozzles N to which ink is supplied from the plurality of ink cartridges 16 identified, the controller 103 may determine the smallest ink amount in the ink amount list as the individual ink amount of ink to be ejected from any one of the plurality of nozzles N.

On the other hand, in response to determining that there is not an ink cartridge 16 in which the remaining amount of ink is equal to or less than the particular threshold (S46: No), the controller 103 determines the first one (i.e., the smallest ink amount) in the ink amount list as the individual ink amount of ink to be ejected from the nozzle N which has the largest total amount of ink ejected therefrom, and deletes the first one from the ink amount list (S48). The controller 103 executes S48 based on the total amount of ink ejected from each nozzle N that is stored in the flash memory 95. At the timing when an ink cartridge 16 has been replaced, the controller 90 resets to zero the total amount of ink ejected from each nozzle N to which ink is supplied from the ink cartridge 16.

After S45, S47, or S48, the controller 103 goes back to S43. In response to determining that the ink amount list does not have ink amount data (i.e., the ink amount list is empty) (S43: No), the controller 103 proceeds to S49. After at least one of the steps S45, S47, and S48 is executed one or more times, the ink amount list may become empty.

Next, in S49, the controller 103 determines whether the individual ink amount of ink to be ejected from each of the nozzles N1 to N4 has been determined for all the pixels A1 to A4 in the image A. In response to determining that the individual ink amount of ink to be ejected from each of the nozzles N1 to N4 has not been determined for all the pixels A1 to A4 in the image A (i.e., when there is, among the pixels A1 to A4, a pixel for which the individual ink amount of ink to be ejected from each of the nozzles N1 to N4 has not been determined) (S49: No), the controller 103 goes back to S41. Then, in S41, the controller 103 determines an amount of ink to be ejected from each of the nozzles N1 to N4 based on the total ink amount for a target pixel for which the individual ink amount has not been determined. Meanwhile, in response to determining that the individual ink amount of ink to be ejected from each of the nozzles N1 to N4 has been determined for all the pixels A1 to A4 in the image A (S49: Yes), the controller 103 terminates the second determination process (see FIG. 11A).

Referring back to FIG. 9, after S32, the controller 103 generates print data to eject ink of the individual ink amount determined in S32 from each nozzle N, and sends the generated print data to the printer 101 (S33). Thus, the print data generation process is completed.

Printing Process

Figure 12:
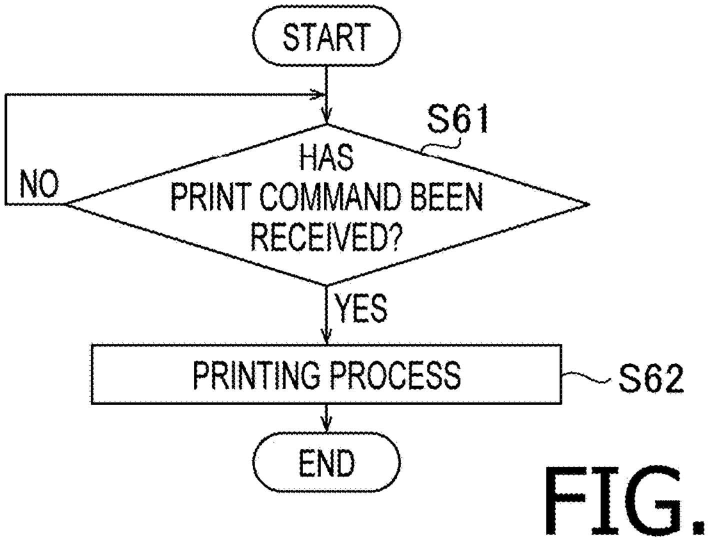
FIG. 12 is a flowchart showing an example procedure of a process to be performed by the printer when printing is performed by the printing system.

A printing process will be described here with reference to FIG. 12. When print data, as a print command, is sent to the printer 101 from the external device 102, the controller 90 of the printer 101 performs a process shown in FIG. 12.

The controller 90 determines whether a print command has been received (S61). In response to determining that a print command has not been received (S61: No), the controller 90 repeatedly executes S61. Meanwhile, in response to determining that a print command has been received (S61: Yes), the controller 90 proceeds to S62.

The controller 90 performs a printing process in S62. In the printing process, the controller 90 alternately and repeatedly performs an ejection scanning operation and a sheet conveyance operation, based on the obtained print data, thereby performing printing on a sheet 1. The ejection scanning operation is a single scanning operation in the forward scanning direction or the backward scanning direction along the main scanning directions. The sheet conveyance is an operation of conveying the sheet 1 in the sub scanning direction. In the sheet conveyance operation between the ejection scanning operations, the sheet 1 is conveyed in the sub scanning direction over a particular distance, which is substantially equal to a separation distance between the two nozzles N located at both end portions of each nozzle row NR in the sub scanning direction among the plurality of nozzles N included in each nozzle row NR.

In the ejection scanning operation, the controller 90 causes the head 10 to eject, from each nozzle N, ink of the individual ink amount determined for each of the nozzles N included in each of the nozzle rows NR1 to NR4 of the head 10. Further, in the ejection scanning operation, when the head 10 is moving in the forward scanning direction or the backward scanning direction relative to the sheet 1, the controller 90 causes the head 10 to eject ink from a nozzle N1 of the nozzle row NR1 toward a particular area on the sheet 1 and to eject ink from corresponding nozzles N2 to N4 of the nozzle rows NR2 to NR4 toward the same particular area on the sheet 1. Thus, the controller 90 controls the head 10 to eject, from each of the nozzles N1 to N4, ink of the individual ink amount determined for each of the nozzles N1 to N4 in the ejection scanning operation.

Figure 13:
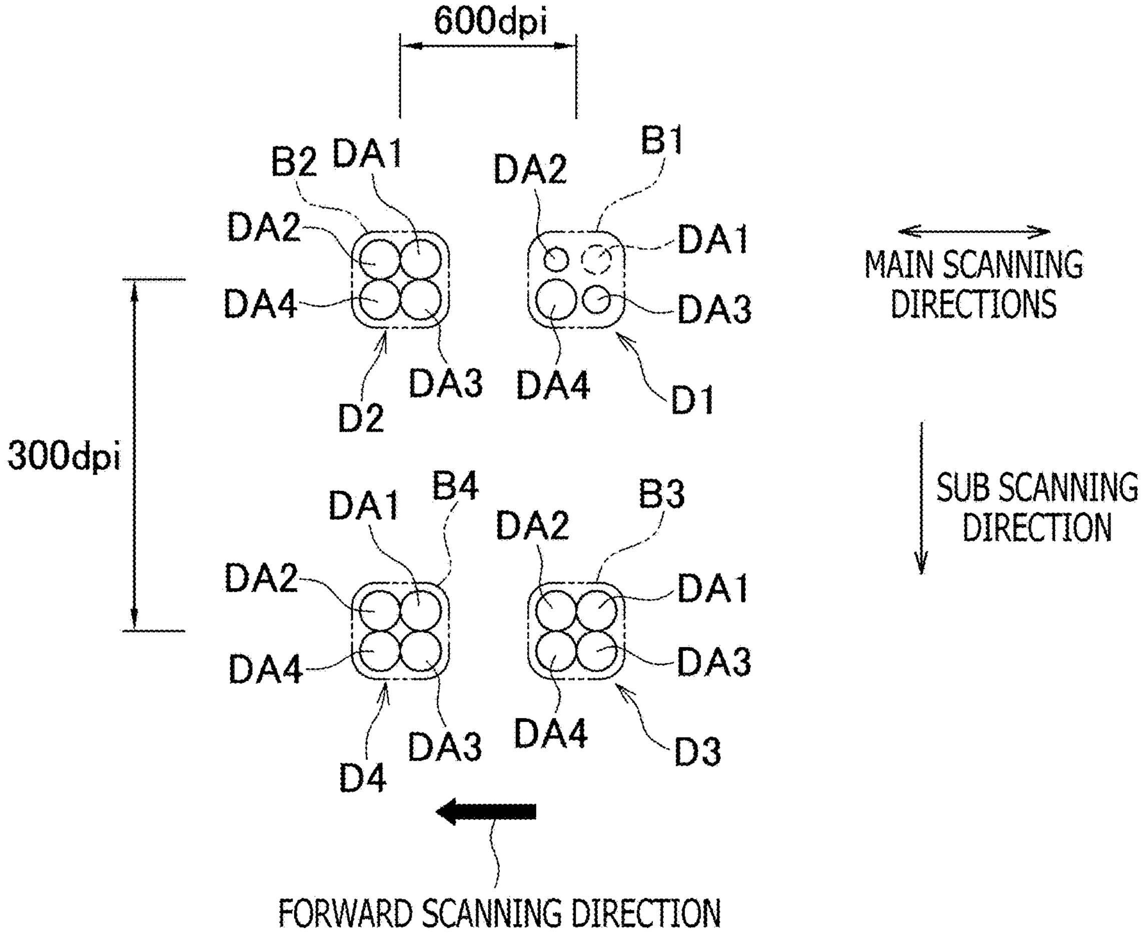
FIG. 13 illustrates a situation where each of a plurality of dots is formed by ink droplets ejected from four nozzles landing within a particular area for each dot.

Suppose for instance that, to form a dot D1 corresponding to the pixel A1 (see FIG. 7) on the sheet 1, the individual ink amount of "No" is assigned to a nozzle N1 of the nozzle row NR1, the individual ink amount of "Small" to a corresponding nozzle N2 of the nozzle row NR2, the individual ink amount of "Medium" to a corresponding nozzle N3 of the nozzle row NR3, and the individual ink amount of "Large" to a corresponding nozzle N4 of the nozzle row NR4. In this case, as shown in FIG. 13, ink of the individual ink amount assigned to each of the nozzles N1 to N4 is ejected from each of the nozzles N1 to N4 toward the same particular area B1 on the sheet 1. Namely, a dot D1 corresponding to the pixel A1 is formed by ink droplets DA1 to DA4 ejected from the nozzles N1 to N4 into the particular area B1. As the individual ink amount of "No" is assigned to the nozzle N1, no ink is ejected from the nozzle N1. However, a portion corresponding to the ink droplet DA1 of the individual ink amount of "No" is indicated by a dashed line in FIG. 13.

Likewise, to form each of dots D2 to D4 corresponding to the pixels A2 to A4 on the sheet 1, ink droplets DA1 to DA4 of the respective individual ink amounts assigned to the corresponding nozzles N1 to N4 are ejected toward a corresponding one of particular areas B2 to B4 corresponding to the pixels A2 to A4 on the sheet 1. Specifically, in the first illustrative embodiment, to form the dot D2 corresponding to the pixel A2 arranged side by side with the pixel A1 along the main scanning directions, the respective individual ink amounts are assigned to the corresponding nozzles N1 to N4 that are the same as when the dot D1 corresponding to the pixel A1 is formed. Then, ink droplets DA1 to DA4 of the respective individual ink amounts assigned to the corresponding nozzles N1 to N4 are ejected from the corresponding nozzles N1 to N4 toward the particular area B2 on the sheet 1. To form the dot D3 corresponding to the pixel A3 arranged side by side with the pixel A1 along the sub scanning direction, the respective individual ink amounts are assigned to the corresponding nozzles N1 to N4 that are adjacent to the nozzles N1 to N4 for the pixel A1 in the sub scanning direction, respectively. Then, ink droplets DA1 to DA4 of the respective individual ink amounts assigned to the corresponding nozzles N1 to N4 are ejected from the corresponding nozzles N1 to N4 toward the particular area B3 on the sheet 1. To form the dot D4 corresponding to the pixel A4 arranged side by side with the pixel A3 along the main scanning directions, the respective individual ink amounts are assigned to the corresponding nozzles N1 to N4 that are the same as when the dot D3 corresponding to the pixel A3 is formed. Then, ink droplets DA1 to DA4 of the respective individual ink amounts assigned to the corresponding nozzles N1 to N4 are ejected from the corresponding nozzles N1 to N4 toward the particular area B4 on the sheet 1. As described above, in the ejection scanning operation, ink of the individual ink amount determined for each of the nozzles N1 to N4 for each of all the pixels A1 to A4 in the image A is ejected from each of the nozzles N1 to N4 onto the sheet 1. Thus, an image corresponding to the image A is formed on the sheet 1.

Ink is ejected from each of the nozzles N1 to N4 into a corresponding one of the particular areas B1 to B4 during the ejection period within one print cycle. Nonetheless, some ink droplets land on the same position on the sheet 1 without positionally deviating from each other, some ink droplets land in such a manner as to partially overlap, and some ink droplets land with some positional deviation from each other without overlapping even partially. However, to form each of the dots D1 to D4 corresponding to the pixels A1 to A4, the ink droplets DA1 to DA4 are ejected from the nozzles N1 to N4, respectively, toward the same target position during the ejection period within one print cycle, and land within a corresponding one of the particular areas B1 to B4 that is an area around the target position. Thus, each of the dots D1 to D4 corresponding to the pixels A1 to A4 is formed on the sheet 1 by the ink droplets DA1 to DA4 ejected from the four nozzles N1 to N4 for each of the pixels A1 to A4.

In the printing process, after image formation on the sheet 1 based on the print data is completed, the sheet 1 is discharged, and the printing is finished. Thus, the process shown in FIG. 12 is terminated.

As described above, according to the printing system 100 in the first illustrative embodiment, in order to form one dot according to the pixel value of a particular pixel, the individual ink amount of ink for each of the nozzles N1 to N4 is determined based on the total ink amount determined according to the pixel value, and ink of the determined individual ink amount is ejected from each of the nozzles N1 to N4 toward a particular area on the sheet 1. In this case, it is possible to form an image with a larger number of gradations (35 gradations in the first illustrative embodiment) than when ink of an amount according to the pixel value is ejected from one nozzle N toward the particular area, in order to form one dot corresponding to the pixel value of the particular pixel.

According to the printing system 100 in the first illustrative embodiment, each of the nozzles N1 to N4 is enabled to eject ink of one of the four types of ink amounts during the ejection period within one print cycle. Then, in the second determination process in S32, the individual ink amount of ink to be ejected from each of the nozzles N1 to N4 is determined from among the four types of ink amounts, according to the total ink amount determined based on the pixel value of each of the pixels A1 to A4. Thereby, it is possible to express the dot corresponding to each of the pixels A1 to A4 with the ink amount determined from among the 35 types of total ink amounts.

In a modification according to aspects of the present disclosure, the head 10 may be configured to eject ink of four types of amounts selected from among 16 different types of amounts individually from the nozzles N1 to N4. In this case, the above configuration may be achieved by the nozzles N1 to N4 having respective different nozzle diameters. Thereby, it is possible to express a particular pixel with an ink amount determined from among up to 256 (the 4th power of 4) types of total ink amounts.

According to the printing system 100 in the first illustrative embodiment, the nozzles N1 to N4 are included in the respective different nozzle rows NR1 to NR4. Further, during a single ejection scanning operation in the printing process, ink is ejected from the nozzles N1 to N4 toward the particular areas B1 to B4. Thereby, it is not required to eject ink toward the particular areas B1 to B4 in a plurality of ejection scanning operations. Thus, it is possible to prevent a printing speed from being reduced.

In S45, the controller 103 determines a smaller individual ink amount for a nozzle N determined as an abnormal nozzle. Thereby, it is possible to reduce the difference between a proper amount of ink to be originally ejected from the nozzle N and an actual amount of ink ejected for real from the abnormal nozzle. Thus, it is possible to suppress the deterioration in image quality even if there exists an abnormal nozzle.

In S48, the controller 103 determines the smallest individual ink amount in the ink amount list as an individual ink amount of ink to be ejected from a nozzle N having the largest total amount of ink ejected therefrom. Specifically, for instance, after the individual ink amount of “Large” is determined to be assigned to a nozzle N for a pixel, when the total amount of ink ejected from the nozzle N is determined, in S48 for another pixel, to be larger than other nozzles N, one of the individual ink amounts “No,” “Small,” and “Medium,” which are smaller than “Large,” is assigned to the nozzle N. This makes it possible to suppress a large difference in the total amount of ink ejected among the plurality of nozzles N. Moreover, for instance, if liquid of the individual ink amount of “Small” is continuously ejected from the same nozzle N, the ink, around the nozzle N, is likely to thicken as the ink dries due to a small ink flow. In contrast, in the configuration as above, liquid of the individual ink amount of “Small” is not continuously ejected from the same nozzle N since the amount of ink ejected from the same nozzle N is changed. Thus, it is possible to increase the ink flow around the nozzle N and suppress the ink thickening.

In a modification according to aspects of the present disclosure, a different individual ink amount from the individual ink amount assigned to a nozzle N for a previous pixel may be assigned to the nozzle N for a current pixel, regardless of the total amount of ink ejected from the nozzle N. In this case as well, it is possible to suppress a large difference in the total amount of ink ejected among the plurality of nozzles N as described above.

In S47, the controller 103 determines the smallest individual ink amount in the ink amount list for a nozzle N to be supplied with ink from an ink cartridge 16 in which the remaining amount of ink is equal to or less than the particular threshold. Specifically, for instance, when the remaining amount of ink in the ink cartridge 16A, which supplies ink to a nozzle N1, is equal to or less than the particular threshold, the controller 103 determines the smallest individual ink amount in the ink amount list as an individual ink amount of ink to be ejected from the nozzle N1. This makes it possible to, even though the remaining amount of ink in the ink cartridge 16A is equal to or less than the particular threshold, perform printing on the sheet 1 even until the ink cartridge 16A is completely refilled or until the ink cartridge 16A is replaced with a new one.

In a modification according to aspects of the present disclosure, the controller 90 may control the head 10 to eject ink from each nozzle N in the order of the nozzles N1 to N4 when the head 10 moves in the forward scanning direction during the ejection scanning operation. Further, the controller 90 may control the head 10 to, when the head 10 moves in the backward scanning direction, eject ink from each nozzle N in the order of the nozzles N4 to N1, i.e., in the reverse order from when the head 10 moves in the forward scanning direction. In this case, in S32, when a total amount of ink to be ejected into a first particular area (an area in which a dot corresponding to a first pixel is formed) during a first ejection scanning operation is the same as a total amount of ink to be ejected into a second particular area (an area in which a dot corresponding to a second pixel is formed) during a second ejection scanning operation, the controller 103 may determine the individual ink amount of ink to be ejected from each nozzle N for each of the first and second ejection scanning operations in such a manner that an order of respective amounts of ink to be ejected from the nozzles N1 to N4 into the first particular area during the first ejection scanning operation is the same as an order of respective amounts of ink to be ejected from the nozzles N4 to N1 into the second particular area during the second ejection scanning operation. Specifically, for instance, suppose that the respective amounts of ink to be ejected from the nozzles N1 to N4 in this order into the first particular area during the first ejection scanning operation are "Small," "Small," "Medium," and "Large." In this case, the controller 103 may determine the individual ink amount of ink to be ejected from each nozzle N for the second ejection scanning operation in such a manner that the respective amounts of ink to be ejected from the nozzles N4 to N1 in this order into the second particular area during the second ejection scanning operation are "Small," "Small," "Medium," and "Large." This makes it possible to suppress variations in image quality between the dot (an image) formed in the first particular area and the dot (an image) formed in the second predetermined area.

Second Illustrative Embodiment

Subsequently, referring to FIG. 14, a printing system 100 in a second illustrative embodiment according to aspects of the present disclosure will be described. In the aforementioned first illustrative embodiment, a single scanning operation is performed in each ejection scanning operation. In contrast, in the second illustrative embodiment, four scanning operations are performed in each ejection scanning operation. More specifically, a scanning operation in the forward scanning direction and a scanning operation in the backward scanning direction are performed alternately and repeated twice in each ejection scanning operation. In the second illustrative embodiment, the ejection scanning operation as above is performed in a case of bidirectional printing. However, in another instance, four scanning operations in one direction of the forward and backward scanning directions may be performed in a case of one-directional printing. In the case of one-directional printing, after a current scanning operation, a next scanning operation may be performed after moving in the opposite direction from the scanning direction in which the current scanning operation is performed. A sheet conveyance process is performed after one scanning operation is completed and before a next scanning operation is performed. In a single sheet conveyance process, the sheet 1 is conveyed in the sub scanning direction over a distance corresponding to a resolution in the sub scanning direction of an image to be printed on the sheet 1. In the second illustrative embodiment, the resolution in the sub scanning direction is 300 dpi, which corresponds to a distance between two adjacent nozzles N in the sub scanning direction. Further, in the second illustrative embodiment, for each single pixel, ink is ejected from only a plurality of nozzles N included in the same nozzle row NR. A dot corresponding to each single pixel is formed by ink being ejected from four nozzles N arranged side by side along the sub scanning direction. A maximum number of scanning operations in each ejection scanning operation needs to be equal to or less than the number of nozzles N included in each nozzle row NR and equal to or less than the number of nozzles assigned to each single pixel.

In a second determination process (see S32) in the second illustrative embodiment, ink is ejected from up to four nozzles N arranged side by side along the sub scanning direction to form a dot corresponding to one pixel. Namely, four nozzles N arranged side by side along the sub scanning direction are assigned to one pixel. In the second illustrative embodiment, to form one pixel, ink is ejected from the plurality of nozzles N included in the same nozzle row NR for the one pixel. Therefore, in response to determining in S44 that there is not an abnormal nozzle stored in the flash memory 95 among the plurality of nozzles N for the one pixel (S44: No), the controller 103 may proceed to S48. Namely, the controller 103 needs to execute neither S46 or S47. In the second determination process in the second illustrative embodiment, the nozzles N for ejecting ink to form a dot corresponding to one pixel are different from those in the aforementioned first illustrative embodiment, and the controller 103 executes neither S46 or S47. Apart from the above features, the printing system 100 in the second illustrative embodiment is configured in substantially the same manner as in the aforementioned first illustrative embodiment. Thus, in S33, the controller 103 generates print data for causing the head 10 to eject from each nozzle N ink of the individual ink amount determined in S32.

The ejection scanning operation in the second illustrative embodiment will be described below. In each ejection scanning operation in the second illustrative embodiment, four scanning operations and a sheet conveyance process between scanning operations are performed. In the following description, a printing procedure for the pixel A1 will be explained, and an explanation of printing procedures for the other pixels A2 to A4 will be omitted. The controller 90 first performs a first scanning operation in the forward scanning direction. In the first scanning operation, the controller 90 controls the head 10 to eject ink of an individual ink amount determined in the second determination process from a first nozzle N1 included in the nozzle row NR1 into the particular area B1. In the first scanning operation, for instance, the individual ink amount of "No" is assigned to the first nozzle N1 included in the nozzle row NR1. Therefore, no ink is ejected from the first nozzle N1. However, in FIG. 14A, a portion corresponding to an ink droplet DA1 of the individual ink amount of "No" is indicated by a dashed line within the particular area B1.

Figure 14A:
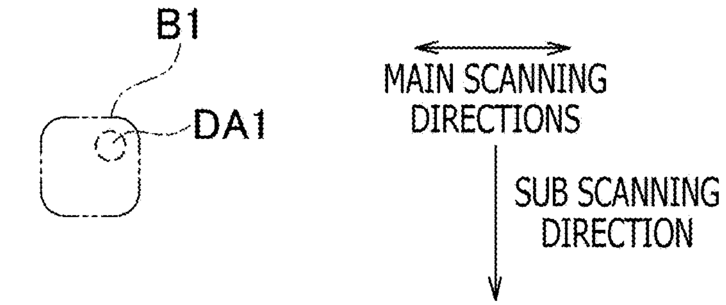
FIG. 14A illustrates a situation where no ink is ejected from a nozzle into a particular area for a dot to be formed.
Figure 14B:
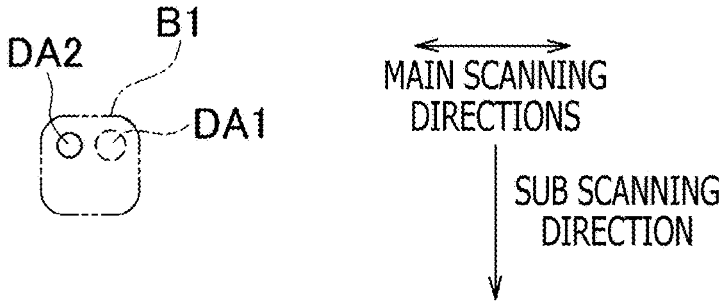
FIG. 14B illustrates a situation where ink of an ink amount corresponding to "Small" is ejected from a nozzle into the particular area for the dot.

Next, the controller 90 conveys the sheet 1 by a distance equivalent to the distance between two adjacent nozzles N in the sub scanning direction. Then, the controller 90 performs a second scanning operation in the backward scanning direction. In the second scanning operation, the controller 90 controls the head 10 to eject ink of an individual ink amount determined in the second determination process from a second nozzle N1 located adjacent to and downstream of the first nozzle N1 in the conveyance direction into the particular area B1. For instance, the individual ink amount of "Small" is assigned to the second nozzle N1. Thus, as shown in FIG. 14B, an ink spot corresponding to an ink droplet DA2 of the individual ink amount of "Small" is formed in the particular area B1.

Figure 14C:
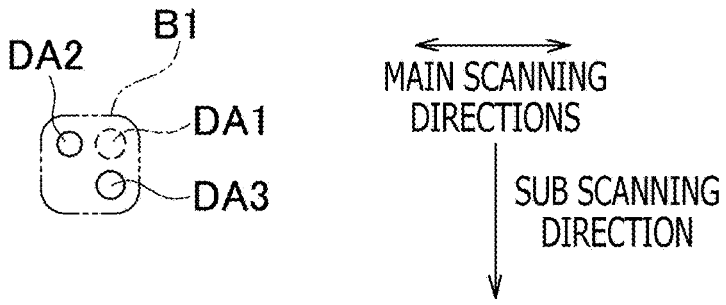
FIG. 14C illustrates a situation where ink of an ink amount corresponding to "Medium" is further ejected from a nozzle into the particular area for the dot.

Next, the controller 90 conveys the sheet 1 by a distance equivalent to the distance between two adjacent nozzles N in the sub scanning direction. Then, the controller 90 performs a third scanning operation in the forward scanning direction. In the third scanning operation, the controller 90 controls the head 10 to eject ink of an individual ink amount determined in the second determination process from a third nozzle N1 located adjacent to and downstream of the second nozzle N1 in the conveyance direction into the particular area B1. For instance, the individual ink amount of "Medium" is assigned to the third nozzle N1. Thus, as shown in FIG. 14C, an ink spot corresponding to an ink droplet DA3 of the individual ink amount of "Medium" is formed in the particular area B1.

Figure 14D:
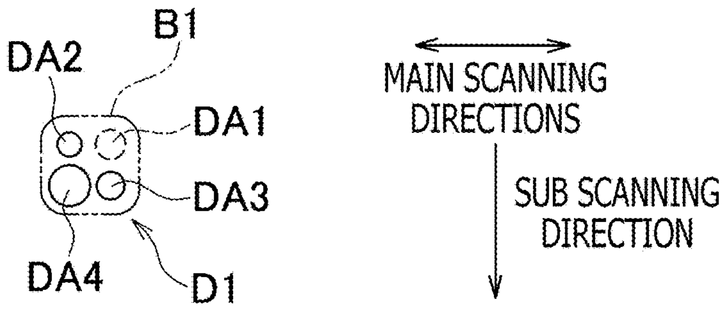
FIG. 14D illustrates a situation where ink of an ink amount corresponding to "Large" is further ejected from a nozzle into the particular area for the dot.

Next, the controller 90 conveys the sheet 1 by a distance equivalent to the distance between two adjacent nozzles N in the sub scanning direction. Then, the controller 90 performs a fourth scanning operation in the backward scanning direction. In the fourth scanning operation, the controller 90 controls the head 10 to eject ink of an individual ink amount determined in the second determination process from a fourth nozzle N1 located adjacent to and downstream of the third nozzle N1 in the conveyance direction into the particular area B1. For instance, the individual ink amount of "Large" is assigned to the fourth nozzle N1. Thereby, as shown in FIG. 14D, an ink spot corresponding to an ink droplet DA4 of the individual ink amount of "Large" is formed in the particular area B1. Thus, as the single ejection scanning operation has been completed, a dot D1 corresponding to the pixel A1 is formed on the sheet 1. For the other pixels A2 to A4 as well, corresponding dots D2 to D4 are formed in the particular area B2 to B4 in substantially the same manner as the pixel A1. Thus, image formation on the sheet 1 in the printing process is completed.

Thus, in the printing system 100 in the second illustrative embodiment, the respective individual ink amounts for the four nozzles N1 are determined according to the pixel value. Then, ink of each individual ink amount is ejected toward the particular area B1 on the sheet 1. Namely, in substantially the same manner as in the first illustrative embodiment, the dot D1 corresponding to the pixel A1 specified is formed by the ink droplets DA1 to DA4 of the respective individual ink amounts being ejected from the four nozzles N1 into the particular area B1. In this case, it is possible to form an image with a larger number of gradations (35 gradations in the second illustrative embodiment) than when ink of one of four types of ink amounts is ejected from one nozzle N toward the particular area B1, in order to form the dot D1 corresponding to the pixel A1 specified. It is noted that it is possible to achieve substantially the same advantageous effects in substantially the same configuration as in the aforementioned first illustrative embodiment.

In the second illustrative embodiment, an image with manifold gradations is formed using a plurality of nozzles N included in the same nozzle row NR. In this case, it is possible to form an image with a large number of gradations even if there are a small number of nozzle rows NR, and therefore to reduce a width of the head 10 in the main scanning directions.

Third Illustrative Embodiment

Figure 15:
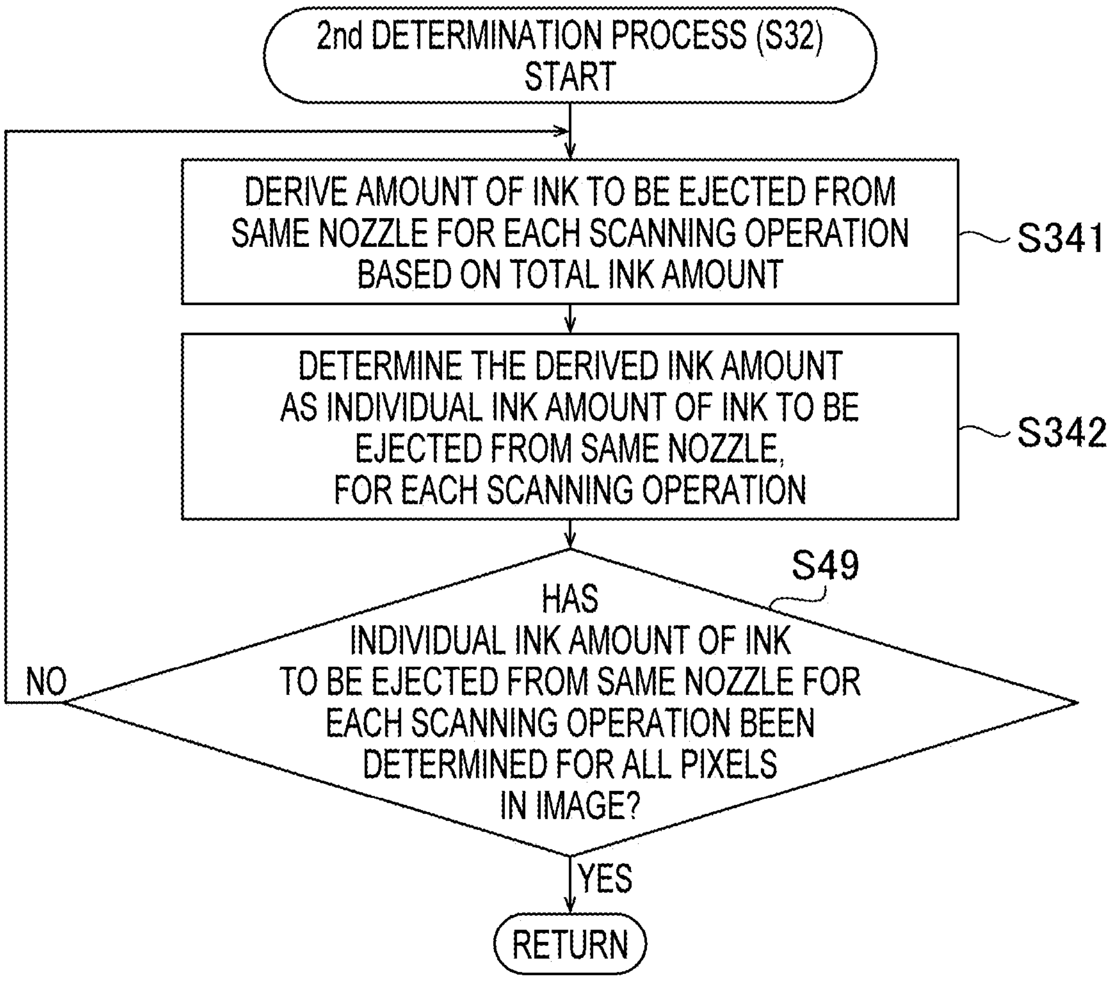
FIG. 15 is a flowchart showing an example procedure of the second determination process.

Subsequently, a printing system 100 in a third illustrative embodiment according to aspects of the present disclosure will be described with reference to FIG. 15. In the ejection scanning operation in the aforementioned second illustrative embodiment, the conveyance process is performed between scanning operations. In contrast, in each ejection scanning operation in the third illustrative embodiment, four scanning operations are performed, but no conveyance process is performed between scanning operations. In the third illustrative embodiment, a scanning operation in the forward scanning direction and a scanning operation in the backward scanning direction are performed alternately and repeated twice, in each ejection scanning operation. In the third illustrative embodiment, the ejection scanning operation as above is performed in a case of bidirectional printing. However, in another instance, four scanning operations in one direction of the forward and backward scanning directions may be performed in a case of one-directional printing, in substantially the same manner as described in the aforementioned second illustrative embodiment. In each ejection scanning operation in the third illustrative embodiment, ink is ejected from the same nozzle N for one pixel. Namely, in the third illustrative embodiment, one nozzle N to eject ink to form a dot corresponding to one pixel may correspond to a "first nozzle" and a "second nozzle" according to aspects of the present disclosure.

In the second determination process (see S32) in the third illustrative embodiment, to form a dot corresponding to one pixel, a single ejection of ink for each scanning operation is out of the same nozzle N, and up to four ejections of ink are out thereof. Namely, the same nozzle N is assigned for each of the scanning operations to form a dot corresponding to one pixel. Thus, in the third illustrative embodiment, since ink is ejected from the same nozzle N, the controller 103 executes S341 instead of the aforementioned step S41, as shown in FIG. 15. In S341, the controller 103 derives an amount of ink to be ejected from the same nozzle N for each scanning operation, based on the total ink amount for one pixel.

Next, the controller 103 determines the ink amount derived in S341 as an individual ink amount of ink to be ejected from the same nozzle N, for each scanning operation (S342). For instance, for the pixel A1, to a specific nozzle N, the individual ink amount of "No" is assigned for a first scanning operation, the individual ink amount of "Small" is assigned for a second scanning operation, the individual ink amount of "Medium" is assigned for a third scanning operation, and the individual ink amount of "Large" is assigned for a fourth scanning operation. The assignment order of "No," "Small," "Medium," and "Large" may be changed as necessary. After S342, the controller 103 proceeds to the aforementioned step S49. In S49, the controller 103 determines whether the individual ink amounts of ink to be ejected from the specific nozzle N have been determined for each of all the pixels A1 to A4 in the image A. In response to determining that the individual ink amounts of ink to be ejected from the specific nozzle N have not been determined for each of all the pixels A1 to A4 (S49: No), the controller 103 goes back to S341. For instance, individual ink amounts for the pixel A2 may be assigned to a nozzle N adjacent to the nozzle N for the pixel A1 in the main scanning directions, since the pixel A2 is adjacent to the pixel A1 in the main scanning directions. Individual ink amounts for the pixel A3 may be assigned to a nozzle N adjacent to the nozzle N for the pixel A1 in the sub scanning direction, since the pixel A3 is adjacent to the pixel A1 in the sub scanning direction. Individual ink amounts for the pixel A4 may be assigned to a nozzle N adjacent to the nozzle N for the pixel A2 in the sub scanning direction, since the pixel A4 is adjacent to the pixel A2 in the sub scanning direction. The nozzles N assigned for the pixels A2 to A4 are not limited to the above nozzles N, but may be changed as needed.

On the other hand, in response to determining that the individual ink amounts of ink to be ejected from the specific nozzle N have been determined for each of all the pixels A1 to A4 (S49: Yes), the controller 103 terminates the second determination process. Thus, the controller 103 generates print data for causing the head 10 to eject ink of the individual ink amounts determined in S32 from each nozzle N (S33).

The ejection scanning operation in the third illustrative embodiment will be described below. In each ejection scanning operation in the third illustrative embodiment, four scanning operations are performed as in the aforementioned second illustrative embodiment. In the following description, a printing procedure for the pixel A1 will be explained, but an explanation of printing procedures for the other pixels A2 to A4 will be omitted. A procedure to form a dot corresponding to the pixel A1 is substantially the same as in the aforementioned second illustrative embodiment, and therefore is described below with reference to FIG. 14. In the third illustrative embodiment, the controller 90 performs a first scanning operation in the forward scanning direction. In the first scanning operation, the controller 90 controls the head 10 to eject ink of an individual ink amount determined in the second determination process from a specific nozzle N (e.g., a nozzle N1 included in the nozzle row NR1) into the particular area B1. For instance, the individual ink amount of "No" is assigned to the nozzle N1. Therefore, no ink is ejected from the nozzle N1. However, a portion corresponding to an ink droplet DA1 of the individual ink amount of "No" is indicated by a dashed line in the particular area B1 in FIG. 14A.

Next, the controller 90 performs a second scanning operation in the backward scanning direction. In the second scanning operation, the controller 90 controls the head 10 to eject ink of an individual ink amount determined in the second determination process from the same nozzle N1 as in the first scanning operation into the particular area B1. For instance, the individual ink amount of "Small" is assigned to the nozzle N1. Thus, as shown in FIG. 14B, an ink spot corresponding to an ink droplet DA2 of the individual ink amount of "Small" is formed in the particular area B1.

Next, the controller 90 performs a third scanning operation in the forward scanning direction. In the third scanning operation, the controller 90 controls the head 10 to eject ink of an individual ink amount determined in the second determination process from the same nozzle N1 as in the first scanning operation into the particular area B1. For instance, the individual ink amount of "Medium" is assigned to the nozzle N1. Thus, as shown in FIG. 14C, an ink spot corresponding to an ink droplet DA3 of the individual ink amount of "Medium" is formed in the particular area B1.

Next, the controller 90 performs a fourth scanning operation in the backward scanning direction. In the fourth scanning operation, the controller 90 controls the head 10 to eject ink of an individual ink amount determined in the second determination process from the same nozzle N1 as in the first scanning operation into the particular area B1. For instance, the individual ink amount of "Large" is assigned to the nozzle N1. Thereby, as shown in FIG. 14D, an ink spot corresponding to an ink droplet DA4 of the individual ink amount of "Large" is formed in the particular area B1. Thus, as the single ejection scanning operation has been completed, a dot D1 corresponding to the pixel A1 is formed on the sheet 1. For the other pixels A2 to A4 as well, corresponding dots D2 to D4 are formed in the particular area B2 to B4 in substantially the same manner as the pixel A1. Thus, image formation on the sheet 1 in the printing process is completed.

In the printing system 100 in this third embodiment, the individual ink amount of ink to be ejected from the same nozzle N is determined for each scanning operation according to the pixel value, and ink of the determined individual ink amount is ejected toward a corresponding one of the particular areas B1 to B4 on the sheet 1. Namely, in substantially the same manner as in the first illustrative embodiment, each of the dots D1 to D4 corresponding to the pixels A1 to A4 is formed by the ink droplets DA1 to DA4 of the respective individual ink amounts being ejected into a corresponding one of the particular areas B1 to B4. In this case as well, it is possible to form an image with manifold gradations (35 gradations in the third illustrative embodiment), as in the aforementioned first illustrative embodiment. It is noted that it is possible to achieve substantially the same advantageous effects in substantially the same configuration as in the aforementioned first illustrative embodiment.

Fourth Illustrative Embodiment

Subsequently, a printing system 100 in a fourth illustrative embodiment according to aspects of the present disclosure will be described below with reference to FIG. 16. In a second determination process (see S32) in the fourth illustrative embodiment, the controller 103 determines each individual ink amount in such a manner that to form a plurality of dots corresponding to a plurality of pixels on the same sheet 1, ink droplets of the same individual ink amounts are ejected from the same nozzles N. Specifically, for instance, suppose that a current pixel is a pixel of which a corresponding dot is to be printed on the same sheet 1 as a previous pixel, that nozzles used for the current pixel are the same as nozzles used for another pixel of which a corresponding dot is to be printed on the same sheet 1 with individual ink amounts as already determined, and that a total ink amount for the current pixel is the same as a total ink amount for the said another pixel of which the corresponding dot is to be printed on the same sheet 1 with the individual ink amounts as already determined. In this case, the controller 103 determines each individual ink amount in such a manner that respective individual ink amounts assigned to the nozzles N for the current pixel are the same as respective individual ink amounts assigned to the same nozzles N for the said another pixel.

Figure 16:
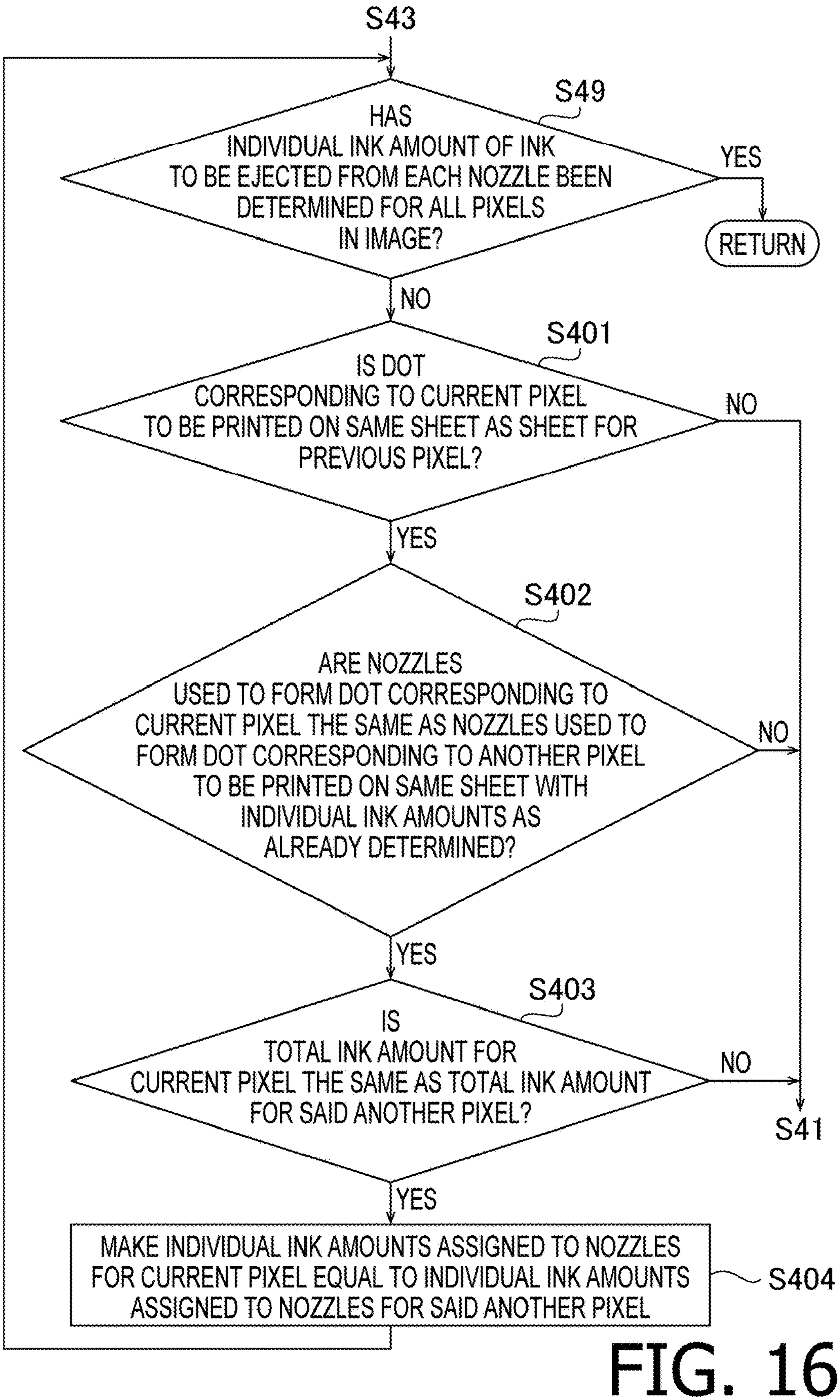
FIG. 16 is a flowchart showing part of an example procedure of the second determination process.

In more detail, as shown in FIG. 16, in response to determining that the individual ink amount of ink to be ejected from each of the nozzles N1 to N4 has not been determined for all the pixels A1 to A4 in the image A (S49: No), the controller 103 proceeds to S401. In S401, the controller 103 determines whether a dot corresponding to the current pixel is to be printed on the same sheet 1 as a sheet 1 for the previous pixel. In response to determining that a dot corresponding to the current pixel is to be printed on a different sheet 1 from the sheet 1 for the previous pixel (S401: No), the controller 103 proceeds to S41. Thus, when the controller 103 proceeds to S41, suppose for instance that the controller 103 executes S48 without executing an aftermentioned step S404. In this case, to print the dot corresponding to the current pixel on a different sheet 1 from the sheet 1 for the previous pixel, different individual ink amounts from individual ink amounts for the previous pixel may be assigned to the same nozzles N even if a total ink amount for the current pixel is the same as a total ink amount for the previous pixel. Specifically, suppose for instance that for a first pixel (as an example of the previous pixel) of which a corresponding dot is to be printed on a first sheet 1, the individual ink amount of "No" is assigned to the first nozzle N, the individual ink amount of "Small" to the second nozzle N, the individual ink amount of "Medium" to the third nozzle N, and the individual ink amount of "Large" to the fourth nozzle N. Even in such a case, for a second pixel (as an example of the current pixel) of which a corresponding dot is to be printed on a second sheet 1 different from the first sheet 1, the individual ink amount of "Small" may be assigned to the first nozzle N, the individual ink amount of "Medium" to the second nozzle N, the individual ink amount of "Large" to the third nozzle N, and the individual ink amount of "No" to the fourth nozzle N. Namely, if the total amount of ink ejected from each nozzle N descends in the order of the fourth nozzle N, the first nozzle N, the second nozzle N, and the third nozzle N, the individual ink amounts may be assigned to the first to fourth nozzles N as described above.

In response to determining that a dot corresponding to the current pixel is to be printed on the same sheet 1 as the sheet 1 for the previous pixel (S401: Yes), the controller 103 determines whether four nozzles N used to form the dot corresponding to the current pixel are the same as four nozzles N used to form a dot corresponding to another pixel to be printed on the same sheet 1 with individual ink amounts as already determined (S402). In response to determining that the four nozzles N used to form the dot corresponding to the current pixel are different from four nozzles N used to form a dot corresponding to any other pixel of which a corresponding dot is to be printed on the same sheet 1 with individual ink amounts as already determined (S402: No), the controller 103 proceeds to S41.

On the other hand, in response to determining that the four nozzles N used to form the dot corresponding to the current pixel are the same as four nozzles N used to form a dot corresponding to another pixel of which a corresponding dot is to be printed on the same sheet 1 with individual ink amounts as already determined (S402: Yes), the controller 103 determines whether a total ink amount for the current pixel is the same as a total ink amount for the said another pixel (S403). In response to determining that the total ink amount for the current pixel is not the same as the total ink amount for the said another pixel (S403: No), the controller 103 proceeds to S41.

On the other hand, in response to determining that the total ink amount for the current pixel is the same as the total ink amount for the said another pixel (S403: Yes), the controller 103 determines the individual ink amounts assigned to the four nozzles N for the current pixel to be equal to the individual ink amounts assigned to the four nozzles N for the said another pixel (S404). Thereafter, the controller 103 goes back to S49. Apart from the aforementioned specific processing associated with the steps S401 to S404 in FIG. 16, the other processing in the fourth illustrative embodiment may be substantially the same as in the first and second illustrative embodiments.

In the printing system 100 in the fourth illustrative embodiment, as S404 is executed, the same amounts of ink are allowed to be ejected from the same nozzles N when the respective dots corresponding to the different pixels are printed on the same sheet 1. This makes it possible to suppress deviations in image quality due to characteristic errors of the nozzles N on an individual-sheet-unit basis. In addition, the amount of ink to be ejected from the same nozzle N is changeable between printing on one sheet 1 and printing on another sheet 1. Thereby, it is possible to suppress large differences in the total amount of ink ejected among a plurality of nozzles N.

In a modification according to aspects of the present disclosure, when the dot corresponding to the current pixel is to be printed on a different sheet 1 from the sheet 1 for the previous pixel, for the current pixel, different individual ink amounts from individual ink amounts for the previous pixel may be assigned to the nozzles N, regardless of the total amounts of ink ejected from the nozzles N. In this case as well, as described above, it is possible to suppress large differences in the total amount of ink ejected among a plurality of nozzles N.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the present disclosure are provided below.

For instance, in the aforementioned illustrative embodiments and modifications, print data is generated by the controller 103 of the external device 102. However, the controller 90 of the printer 101 alone may generate print data and perform a printing process. In other words, the printing system 100 may consist of only the printer 101. In this case as well, it is possible to achieve substantially the same advantageous effects as in the aforementioned illustrative embodiments and modifications.

In the first determination process in each of the aforementioned illustrative embodiments, it is determined which, of the 35 types of total ink amounts distinguished by the 34 types of threshold values, a pixel value of a first pixel corresponds to. However, in another instance, when the pixel value of the first pixel corresponds to a specific ink amount between adjacent total ink amounts among the 35 types of total ink amounts, e.g., as listed in FIG. 10, a total ink amount corresponding to a pixel value of a second pixel, located adjacent to the first pixel, may be determined by adding a difference between the specific ink amount for the first pixel and the total ink amount determined for the first pixel to a specific ink amount corresponding to the pixel value of the second pixel. Namely, an error diffusion method may be further used in the first determination process.

In the second determination process in each of the aforementioned illustrative embodiments, the controller 103 needs only to determine the individual ink amount of ink to be ejected from each appropriate nozzle N based on the total ink amount, and may not necessarily perform the steps S42 to S48.

In each of the aforementioned illustrative embodiments, the determination circuit 78 is configured to output a signal according to whether each nozzle N is an abnormal nozzle. However, practicable examples are not limited to this. For instance, a detection electrode extending in the vertical direction may be disposed. In this case, a determination circuit may be configured to output a signal according to whether a nozzle N is an abnormal nozzle in accordance with an electrical potential of the detection electrode when ink is ejected from the nozzle N in such a manner as to pass through a region opposite to the detection electrode. In another instance, an optical sensor may be provided to detect ink ejected from each nozzle N. In this case, the optical sensor may be configured to output a signal according to whether each nozzle N is an abnormal nozzle.

In the above examples, a nozzle N from which no ink is ejected is determined to be an abnormal nozzle. However, practicable examples are not limited to this. For example, a detector configured to output a signal according to whether a direction (hereinafter referred to as an "ejection direction") of ink ejected from each nozzle N is normal may be provided. In this case, based on the signal from the detector, it may be determined that a nozzle N from which the ejection direction of the ink ejected is abnormal is an abnormal nozzle.

In yet another instance, a detector configured to output a signal according to an abnormal nozzle state other than a state where a nozzle N is unable to eject ink therefrom may be provided. In this case, based on the signal from the detector, information on the abnormal nozzle state may be obtained. Examples of the abnormal nozzle state may include, but are not limited to, a state where the ejection direction of the ink ejected from a nozzle N is abnormal, a state where splashes occur when ink is ejected from a nozzle N, and a state where air bubbles are present in the ink ejected from a nozzle N, and a state where paper dust is stuck in a nozzle N. In this case, inspection driving may be performed in which a pressure is applied to ink to such an extent as to cause the ink not to be ejected from a nozzle N, thereby vibrating the ink around the nozzle N. Then, the printing system 100 may be configured to cause the detector to output a signal according to a vibration status of the ink around the nozzle N, thereby obtaining information on the abnormal nozzle state. The printer 101 in each of the aforementioned illustrative embodiments may not have a detector.

In the aforementioned illustrative embodiments and modifications, the head 10 has the four nozzle rows NR1 to NR4. However, the head 10 may have two or three, or five or more nozzle rows NR. The nozzle rows NR1 to NR4 may not necessarily be arranged at regular intervals along the main scanning directions. In this case, during a printing process, the head 10 may be controlled to eject ink from a nozzle N included in each of the nozzle rows NR1 to NR4 at a timing corresponding to a particular print resolution in the main scanning directions. In the printing process described above, ink may be ejected from only some (i.e., at least one but not all) of the plurality of nozzles N included in the nozzle row NR in the manner as described above. In the aforementioned first illustrative embodiment, two or more nozzle rows NR may be selected from among the plurality of nozzle rows NR, and nozzles N included in the selected two or more nozzle rows NR may be used to eject ink in the ejection scanning operation. In the aforementioned second illustrative embodiment, only one nozzle row NR may be used to eject ink in the ejection scanning operation.

In each of the aforementioned illustrative embodiments, the head 10 is configured to eject ink of any of the four types of ink amounts from each nozzle N. However, the head 10 may be configured to eject ink of any of two or three, or five or more types of ink amounts from each nozzle N.

In the aforementioned first illustrative embodiment, practicable types of the head 10 are not limited to a serial type, but may include a line type (i.e., a type of head fixed in such a manner that it does not move in a direction intersecting the conveyance direction in which the sheet 1 is conveyed). In this case, a line type head may include a plurality of nozzle rows, each of which includes a plurality of nozzles arranged along a direction intersecting the conveyance direction of the sheet 1. Further, in this case, the plurality of nozzle rows may be arranged side by side along the conveyance direction. In a printer having such a line type head as well, it is possible to achieve substantially the same advantageous effects as described above.

Practicable examples of the head 10 in the aforementioned second and third illustrative embodiments described above are not limited to a monochrome head configured to eject black ink, but may include a color head configured to eject ink of respective different colors from a plurality of nozzle rows NR. In this case as well, it is possible to achieve substantially the same advantageous effects as described above.

Practicable examples of the "liquid ejection apparatus" according to aspects of the present disclosure are not limited to printers, but may include fax machines, copiers, multi-functional peripherals. In addition, aspects of the present disclosure may be applied to liquid ejection apparatuses (e.g., apparatuses or devices having a liquid ejection head configured to eject electrically-conductive liquid onto a substrate to form an electrically-conductive pattern) used for purposes other than image recording. Practicable examples of the ejection target onto which liquid is ejected are not limited to sheets, but may include fabrics, substrates, and any other recording media other than sheet-like media. Practicable examples of the liquid ejected from the nozzles are not limited to ink, but may include any type of liquid (e.g., processing liquid for agglomerating or precipitating components in the ink). In this case, it is preferable that the liquid ejection head is configured to eject the same type (e.g., the same color) of liquid from all nozzles for ejecting the liquid into the same area.

The following shows examples of associations between elements illustrated in the aforementioned illustrative embodiment(s) and modification(s), and elements claimed according to aspects of the present disclosure. For instance, the printing system 100 may be an example of a "liquid ejection system" according to aspects of the present disclosure. The printer 101 may be an example of a "liquid ejection apparatus" according to aspects of the present disclosure. The controller 90 of the printer 101 and the controller 103 of the external device 102 may be included in a "controller system" according to aspects of the present disclosure. The head 10 may be an example of a "head" according to aspects of the present disclosure. The moving mechanism 30 may be an example of a "mover" according to aspects of the present disclosure. The conveyor 50 may be an example of a "conveyor" according to aspects of the present disclosure. The detection electrode 76, the high-voltage power supply circuit 77, the resistor 79, and the determination circuit 78 may be included in a "detector" according to aspects of the present disclosure. The ink cartridge 16A may be an example of a "first container" according to aspects of the present disclosure. The ink cartridges 16B to 16D may be included in examples of a "second container" according to aspects of the present disclosure. The nozzle row NR1 may be an example of a "first nozzle row" according to aspects of the present disclosure. The nozzle rows NR2 to NR4 may be included in examples of a "second nozzle row" according to aspects of the present disclosure. The ink amounts corresponding to "No," "Small," and "Medium" may be included in examples of a "first liquid amount" according to aspects of the present disclosure. The ink amounts corresponding to "Small," "Medium," and "Large" may be included in examples of a "second liquid amount" larger than the "first liquid amount" according to aspects of the present disclosure.

What is claimed is:

1. A liquid ejection system comprising:

a head having a plurality of nozzles including a first nozzle and a second nozzle, the plurality of nozzles being aligned in a first nozzle row and a second nozzle row, the first nozzle row and the second nozzle row extending in a first direction and being arranged along a second direction intersecting the first direction; and a controller system configured to:

determine a first individual amount of liquid to be ejected from the first nozzle, and a second individual amount of liquid to be ejected from the second nozzle, based on a pixel value of a particular pixel included in image data, including:

determining a total amount of liquid to be ejected for the particular pixel based on the pixel value of the particular pixel; and determining the first individual amount for the first nozzle and the second individual amount for the second nozzle based on the determined total amount; and control the head to eject liquid of a same color from at least one of the first nozzle or the second nozzle into a particular area on a recording medium while moving one of the head and the recording medium relative to the other along the second direction, the first nozzle being controlled to eject the liquid of the determined first individual amount, the second nozzle being controlled to eject the liquid of the determined second individual amount.

2. The liquid ejection system according to claim 1, wherein the first nozzle is configured to, during an ejection period within one ejection cycle, eject the liquid of one amount selected from among M types of amounts, M being an integer equal to or more than two, wherein the second nozzle is configured to, during the ejection period within the one ejection cycle, eject the liquid of one amount selected from among N types of amounts, N being an integer equal to or more than two, and wherein the controller system is further configured to determine, as the first individual amount, one amount selected from among the M types of amounts, and determine, as the second individual amount, one amount selected from among the N types of amounts.

3. The liquid ejection system according to claim 1, wherein the first nozzle is included in the first nozzle row, wherein the second nozzle is included in the second nozzle row, wherein the first nozzle and the second nozzle are positioned to overlap when viewed in the second direction, and wherein the controller system is further configured to control the head to eject the liquid from the first nozzle and the second nozzle into the particular area during a single moving operation of moving one of the head and the recording medium relative to the other along the second direction.

4. The liquid ejection system according to claim 1, further comprising a mover configured to move the head relative to the recording medium along the second direction, wherein the controller system is further configured to:

cause the head to eject the liquid from the first nozzle or the second nozzle into the particular area during a first-time moving operation of moving the head relative to the recording medium by the mover; and cause the head to eject the liquid from the first nozzle or the second nozzle into the particular area during a second-time moving operation of moving the head relative to the recording medium by the mover.

5. The liquid ejection system according to claim 4, further comprising a conveyor configured to convey the recording medium in the first direction, wherein the first nozzle and the second nozzle are included in the first nozzle row, and wherein the controller system is further configured to:

cause the head to eject the liquid from the first nozzle into the particular area during the first-time moving operation of moving the head relative to the recording medium by the mover;

after the first-time moving operation, cause the conveyor to convey the recording medium in the first direction; and after conveying the recording medium by the conveyor, cause the head to eject the liquid from the second nozzle into the particular area during the second-time moving operation of moving the head relative to the recording medium by the mover.

6. The liquid ejection system according to claim 4, wherein the mover is further configured to move the head relative to the recording medium in the second direction and in a third direction opposite to the second direction, wherein the controller system is further configured to:

cause the head to eject the liquid from the first nozzle or the second nozzle into the particular area during the first-time moving operation of moving the head relative to the recording medium in the second direction by the mover; and cause the head to eject the liquid from the first nozzle or the second nozzle into the particular area during the second-time moving operation of moving the head relative to the recording medium in the third direction by the mover.

7. The liquid ejection system according to claim 6, further comprising a conveyor configured to convey the recording medium in the first direction, wherein the first nozzle and the second nozzle are included in the first nozzle row, and wherein the controller system is further configured to:

cause the head to eject the liquid from the first nozzle into the particular area during the first-time moving operation of moving the head relative to the recording medium in the second direction by the mover;

after the first-time moving operation, cause the conveyor to convey the recording medium in the first direction; and after conveying the recording medium by the conveyor, cause the head to eject the liquid from the second nozzle into the particular area during the second-time moving operation of moving the head relative to the recording medium in the third direction by the mover.

8. The liquid ejection system according to claim 1, further comprising a detector configured to detect whether each nozzle is an abnormal nozzle that is unable to eject liquid normally, wherein the controller system is further configured to:

derive a first liquid amount and a second liquid amount based on the pixel value of the particular pixel, the second liquid amount being larger than the first liquid amount; and when an abnormal nozzle has been detected by the detector between the first nozzle and the second nozzle, determine the first liquid amount as an individual amount of liquid to be ejected from the abnormal nozzle, and determine the second liquid amount as an individual amount of liquid to be ejected from a nozzle other than the abnormal nozzle.

9. The liquid ejection system according to claim 1, wherein the controller system is further configured to:

derive a first liquid amount and a second liquid amount based on the pixel value of the particular pixel; and determine one of the first liquid amount and the second liquid amount as an individual amount of liquid to be ejected from a specific nozzle, and thereafter determine the other of the first liquid amount and the second liquid amount as an individual amount of liquid to be ejected from the same specific nozzle.

10. The liquid ejection system according to claim 1, wherein the controller system is further configured to:

when a dot corresponding to the particular pixel and a dot corresponding to another particular pixel are to be printed on a first recording medium, one or more nozzles used to form the dot corresponding to the particular pixel are the same as one or more nozzles used to form the dot corresponding to the particular pixel of which the corresponding dot is to be printed on the first recording medium with already determined individual liquid amounts, and a total liquid amount based on a pixel value of the particular pixel is the same as a total liquid amount based on the pixel value of the another particular pixel, determine, based on the pixel value of the another particular pixel, a third individual amount of liquid to be ejected from the first nozzle, and a fourth individual amount of liquid to be ejected from the second nozzle, the third individual amount being determined to be equal to the first individual amount, the fourth individual amount being determined to be equal to the second individual amount.

11. The liquid ejection system according to claim 10, wherein the controller system is further configured to:

after printing on the first recording medium, when the dot corresponding to the another particular pixel is to be printed on a second recording medium different from the first recording medium, determine, based on the pixel value of the another particular pixel, a fifth individual amount of liquid to be ejected from the first nozzle, and a sixth individual amount of liquid to be ejected from the second nozzle.

12. The liquid ejection system according to claim 1, further comprising:

a first container configured to store liquid to be supplied to the first nozzle; and a second container configured to store liquid to be supplied to the second nozzle, wherein the controller system is further configured to:

derive a first liquid amount and a second liquid amount based on the pixel value of the particular pixel, the second liquid amount being larger than the first liquid amount;

when a remaining amount of the liquid in the first container is equal to or less than a particular threshold, and a remaining amount of the liquid in the second container is more than the particular threshold, determine the first liquid amount as the first individual amount of liquid to be ejected from the first nozzle, and determine the second liquid amount as the second individual amount of liquid to be ejected from the second nozzle.

13. The liquid ejection system according to claim 3, further comprising:

a mover configured to move the head relative to the recording medium in the second direction and in a third direction opposite to the second direction; and a conveyor configured to convey the recording medium in the first direction, wherein the controller system is further configured to:

cause the head to eject the liquid from the first nozzle into the particular area and thereafter eject the liquid from the second nozzle into the particular area during a first-time moving operation of moving the head in the second direction by the mover;

after the first-time moving operation, cause the conveyor to convey the recording medium in the first direction;

after conveying the recording medium by the conveyor, cause the head to eject the liquid from the second nozzle into another particular area and thereafter eject the liquid from the first nozzle into the another particular area during a second-time moving operation of moving the head in the third direction by the mover; and when a total amount of the liquid to be ejected into the particular area during the first-time moving operation is equal to a total amount of the liquid to be ejected into the another particular area during the second-time moving operation, determine:

the first individual amount of the liquid to be ejected from the first nozzle into the particular area during the first-time moving operation;

the second individual amount of the liquid to be ejected from the second nozzle into the particular area during the first-time moving operation;

a third individual amount of the liquid to be ejected from the first nozzle into the another particular area during the second-time moving operation, the third individual amount being determined to be equal to the first individual amount; and a fourth individual amount of the liquid to be ejected from the second nozzle into the another particular area during the second-time moving operation, the fourth individual amount being determined to be equal to the second individual amount.

14. The liquid ejection system according to claim 3, further comprising a liquid ejection apparatus that comprises the head, wherein the liquid ejection apparatus includes a part of the controller system.

* * * * *